(12) United States Patent
Kdoshim et al.

(10) Patent No.: US 11,995,419 B1
(45) Date of Patent: May 28, 2024

(54) GRAPHICAL USER INTERFACE FOR CODE TO DATAFLOW GRAPH REPRESENTATION

(71) Applicant: Next Silicon Ltd, Givatayim (IL)

(72) Inventors: Oshri Kdoshim, Ramat Gan (IL); Elad Raz, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/383,537

(22) Filed: Oct. 25, 2023

(51) Int. Cl.
*G06F 8/30* (2018.01)
*G06F 8/34* (2018.01)

(52) U.S. Cl.
CPC ..................... *G06F 8/34* (2013.01)

(58) Field of Classification Search
CPC ..... G06F 8/30; G06F 8/33; G06F 8/34; G06F 8/38; G06F 8/048; G06F 8/41; G06F 8/443
See application file for complete search history.

(56) References Cited

U.S. PATENT DOCUMENTS

| | | | | |
|---|---|---|---|---|
| 7,368,835 | B2 * | 5/2008 | VanOrden | G06F 1/189 307/64 |
| 9,600,401 | B1 * | 3/2017 | Haischt | G06F 3/0484 |
| 9,658,943 | B2 * | 5/2017 | Gounares | G06F 11/3664 |

OTHER PUBLICATIONS

Matus Sulir et al., Visual augmentation of source code editors: A systematic mapping study, Journal of Visual Languages & Computing (JVLC), vol. 49, 2018, pp. 46-5. (Year: 2018).*

* cited by examiner

*Primary Examiner* — Hanh Thi-Minh Bui

(57) ABSTRACT

There is provided a method, comprising simultaneously presenting in a GUI, a source code and an interactive graph of nodes connected by edges representing the source code mapped to physical configurable elements of computational cluster(s) of a processor each configurable to execute mathematical operations, each node represents operation(s) mapped to physical configurable elements, and edges represent dependencies between the operations, mapped to physical dependency links between the configurable elements, receiving, via the GUI, a user selection of a portion of the source code, determining node(s) and/or edge(s) of the interactive graph corresponding to the portion, and updating the GUI for visually distinguishing the node(s) and/or edge(s), wherein the visually distinguished node(s) represents a mapping to certain physical configurable elements and the visually distinguished edge(s) represents certain dependency links between the certain physical configurable elements of the processor configured to execute the user selected portion of the source code.

24 Claims, 25 Drawing Sheets

GRAPHICAL USER INTERFACE FOR CODE TO DATAFLOW GRAPH REPRESENTATION

BACKGROUND

The present invention, in some embodiments thereof, relates to user interfaces and, more specifically, but not exclusively, to user interfaces for navigating code-graphs of a source code, executed by a processor, optionally a dataflow processor.

Dataflow refers to a computer programming paradigm that models at least part of a software program as a directed graph of data flowing between operations. Processors based on dataflow architectures are in contrast to processors based on traditional von Neumann architectures, in which instructions are executed sequentially.

SUMMARY

According to a first aspect, a computer implemented method of operating a graphical user interface (GUI) presenting a representation of code for execution by a processor, comprises: presenting in the GUI, a source code, presenting in the GUI simultaneously with the source code, an interactive graph of a plurality of nodes connected by edges representing the source code mapped to physical configurable elements of at least one computational cluster of the processor each configurable to execute mathematical operations, wherein each node represents at least one operation mapped to physical configurable elements, and edges between nodes represent dependencies between the operations, mapped to physical dependency links between the configurable elements, receiving, via the GUI, a user selection of a portion of the source code, determining at least one of: at least one node and at least one edge of the interactive graph corresponding to the portion of the source code, and updating the GUI for visually distinguishing the at least one of: the at least one node and the at least one edge of the interactive graph, wherein the visually distinguished at least one node represents a mapping to certain physical configurable elements and the visually distinguished at least one edge represents certain dependency links between the certain physical configurable elements of the processor configured to execute the user selected portion of the source code.

According to a second aspect, a computer implemented method of operating a graphical user interface (GUI) presenting a representation of code for execution by a processor, comprises: presenting in the GUI, a source code, presenting in the GUI simultaneously with the source code, an interactive graph of a plurality of nodes connected by edges representing the source code mapped to physical configurable elements of at least one computational cluster of the processor each configurable to execute operations, wherein each node represents at least one operation mapped to physical configurable elements, and edges between nodes represent dependencies between the operations, mapped to physical dependency links between the physical configurable elements, receiving, via the GUI, a user selection of at least one of: at least one node and at least one edge of the interactive graph representing a mapping to certain physical configurable elements and certain dependency links between the certain physical configurable elements of the processor configured to execute a portion of the source code, determining the portion of the source code corresponding to the at least one of: at least one node and at least one edge, and updating the GUI for visually distinguishing the portion of the source code.

In a further implementation form of the any of the aspects described herein, the processor comprises a dataflow processor.

In a further implementation form of the first and second aspects, the processor comprises a non-dataflow processor, and the interactive graph is of a lower-level representation and/or intermediate representation of the source code mapped to physical configurable elements of the non-dataflow processor.

In a further implementation form of the first and second aspects, further comprising: receiving, via the GUI, a user selection of at least one of: at least one node and at least one edge of the interactive graph, determining a portion of the source code corresponding to the selected at least one of: at least one node and at least one edge, and updating the GUI for visually distinguishing the portion of the source code.

In a further implementation form of the first and second aspects, visually distinguishing comprises marking the at least one of: at least one node and at least one edge of the interactive graph corresponding to the user selected portion of the source code with a marking that is different from other nodes and/or other edges of the interactive graph.

In a further implementation form of the first and second aspects, each node is associated with at least one of: a type of the node, connectivity to other nodes, and special traits of the node.

In a further implementation form of the first and second aspects, the user selection is selected from a group consisting of: a function, an execution block, and a line of code.

In a further implementation form of the first and second aspects, further comprising: obtaining compiler generated debug data corresponding to nodes of the interactive graph, traversing the nodes of the interactive graph, and mapping the debug data to lines of the source codes according to the traversing.

In a further implementation form of the first and second aspects, the determining is performed by executing a query of the user selected portion of the source code on the outcome of the mapping.

In a further implementation form of the first and second aspects, nodes of the interactive graph that map to the source code include a visual marker, and other nodes of the interactive graph that do not map to the source code exclude the visual marker.

In a further implementation form of the first and second aspects, further comprising: in response to a toggling between different representations of the interactive graph of decreasing abstraction and increasing hardware representation of the processor received via the GUI, updating the GUI for visually distinguishing the at least one node and/or at least one edge from a currently presented representation of the interactive graph to the toggled representation of the interactive graph according to a mapping of nodes and edges between the different representations of the interactive graph.

In a further implementation form of the first and second aspects, further comprising: receiving via the GUI, a user selection of one of a plurality of representation of the interactive graph of decreasing abstraction and increasing hardware representation of the processor, determining a mapping between nodes and edges of a currently presented representation of the interactive graph presented in the GUI and nodes and edges of the user selected representation of the interactive graph, updating the GUI from the currently presented representation of the interactive graph to the user selected representation of the interactive graph, and visually distinguishing, according to the mapping, at least one of: at least one node and at least one edge of the user selected presentation of the interactive graph corresponding to the visually distinguished at least one of: at least one node and at least one edge of the currently presented representation of the interactive graph.

In a further implementation form of the first and second aspects, the plurality of representations of the interactive graph include a logical representation closest to the source code, compute representation representing an intermediate representation indicating optimization of the logical representation towards the hardware representation, and a hardware representation indicating mapping of source code to regions of the processor executing the source code.

In a further implementation form of the first and second aspects, updating comprises updating the presentation of the interactive graph within the GUI for depicting links between the visually distinguished at least one node, and excluding links between other nodes.

In a further implementation form of the first and second aspects, further comprising: computing a projection graph of the interactive graph representing the source code, the projection graph including nodes mapped to computational clusters of the processor executing respective portions of the source code by respective computational clusters, and presenting within the GUI the projection graph overlaid on a hardware representation of the processor executing the source code.

In a further implementation form of the first and second aspects, further comprising: receiving via the GUI, a user input for a zoom in on the projection graph, and updating the GUI for presenting nodes of the graph projected on computational clusters of the processor, wherein each computational cluster include a plurality of logical element units that are configurable to perform operations.

In a further implementation form of the first and second aspects, further comprising: presenting within the GUI, the interactive graph representing the source code, receiving, via the GUI, a user selection of at least one node of the interactive graph, determining at least one node of the projection graph corresponding to the user selected at least one node, and updating the GUI for visually distinguishing the at least one node of the projection graph overlaid on the hardware representation of the processor.

In a further implementation form of the first and second aspects, further comprising: presenting within the GUI, the interactive graph representing the source code, receiving, via the GUI, a user selection of at least one node of the projection graph, determining at least one node of the interactive graph corresponding to the user selected at least one node of the projection graph, and updating the GUI for visually distinguishing the at least one node of the interactive graph corresponding to the user selected at least one node of the projection graph.

In a further implementation form of the first and second aspects, further comprising: receiving, via the GUI, a user selection of at least one node of the interactive graph, and updating the GUI for presenting at least one of: (i) real time performance metrics of the at least one node of the interactive graph during execution of the source code by the processor, and (ii) historical data of the performance metrics, wherein the GUI is dynamically updated in real time for presenting updates of at least one of (i) the real time performance metrics, and (ii) the historical data of the performance metrics.

In a further implementation form of the first and second aspects, each node of the interactive graph represents a sub-graph, wherein edges between the sub-graphs represent dependencies between the sub-graphs.

In a further implementation form of the first and second aspects, further comprising receiving, via the GUI, a user selection of at least one node of the connected nodes of the interactive graph representing at least one sub-graph, determining a portion of the source code corresponding to the at least one sub-graph, and updating the GUI for visually distinguishing the portion of the source code.

According to a third aspect, a computer implemented method of operating a graphical user interface (GUI) presenting a schematic of a processor, comprises: presenting in GUI, the schematic of the processor including a plurality of computational clusters, with visual indication of at least one computational cluster of the plurality of computational clusters executing a source code, receiving, via the GUI, a user selection of at least one computational cluster of the plurality of computational clusters executing the source code, and updating the GUI, for visually distinguishing a portion of the source code being executed by the at least one computational cluster selected by the user.

In a further implementation form of the third aspect, further comprising: presenting in the GUI simultaneously with the schematic of the processor, an interactive graph of a plurality of connected nodes representing the source code in a representation for execution by at least one computational cluster of the processor, and in response to the user selection, updating the GUI for visually distinguishing at least one node of the plurality of connected nodes of the interactive graph corresponding to the user selected at least one computational cluster and to the portion of the source code corresponding to the user selected at least one computational cluster.

In a further implementation form of the third aspect, further comprising: receiving, via the GUI, a user selection of at least one memory region of the processor, and updating the GUI, for visually distinguishing a memory allocation request of the source code and/or a call stack up to an allocation routine at a time of allocation, corresponding to the at least one memory region selected by the user.

In a further implementation form of the third aspect, further comprising: receiving, via the GUI, a user selection of at least one bin denoting a memory cache element of the processor, and updating the GUI, for visually representing an element in at least one memory region of the processor corresponding to the at least one bin.

According to a fourth aspect, a computer implemented method of operating a graphical user interface (GUI) presenting a representation of code for execution by a processor, comprises: presenting in the GUI, a source code, presenting in the GUI simultaneously with the source code, a projection graph of a plurality of nodes connected by edges representing the source code in a representation for execution by the processor, the projection graph presented as an overlay, wherein nodes of the projection graph corresponding to different portions of the source code are overlaid over corresponding computational clusters of the processor executing respective portions of the source code, at least one of: (i) receiving, via the GUI, a user selection of a portion of the source code, determining at least one of: at least one node and at least one edge of the projection graph corresponding to the portion of the source code, and updating the GUI for visually distinguishing the at least one of: at least one node and at least one edge of the projection graph, and (ii) receiving, via the GUI, a user selection of at least one of: at least one node and at least one edge of the projection graph, determining a portion of the source code corresponding to the at least one of: at least one node and at least one edge of the projection graph, and updating the GUI for visually distinguishing the portion of the source code.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

Figure 7:
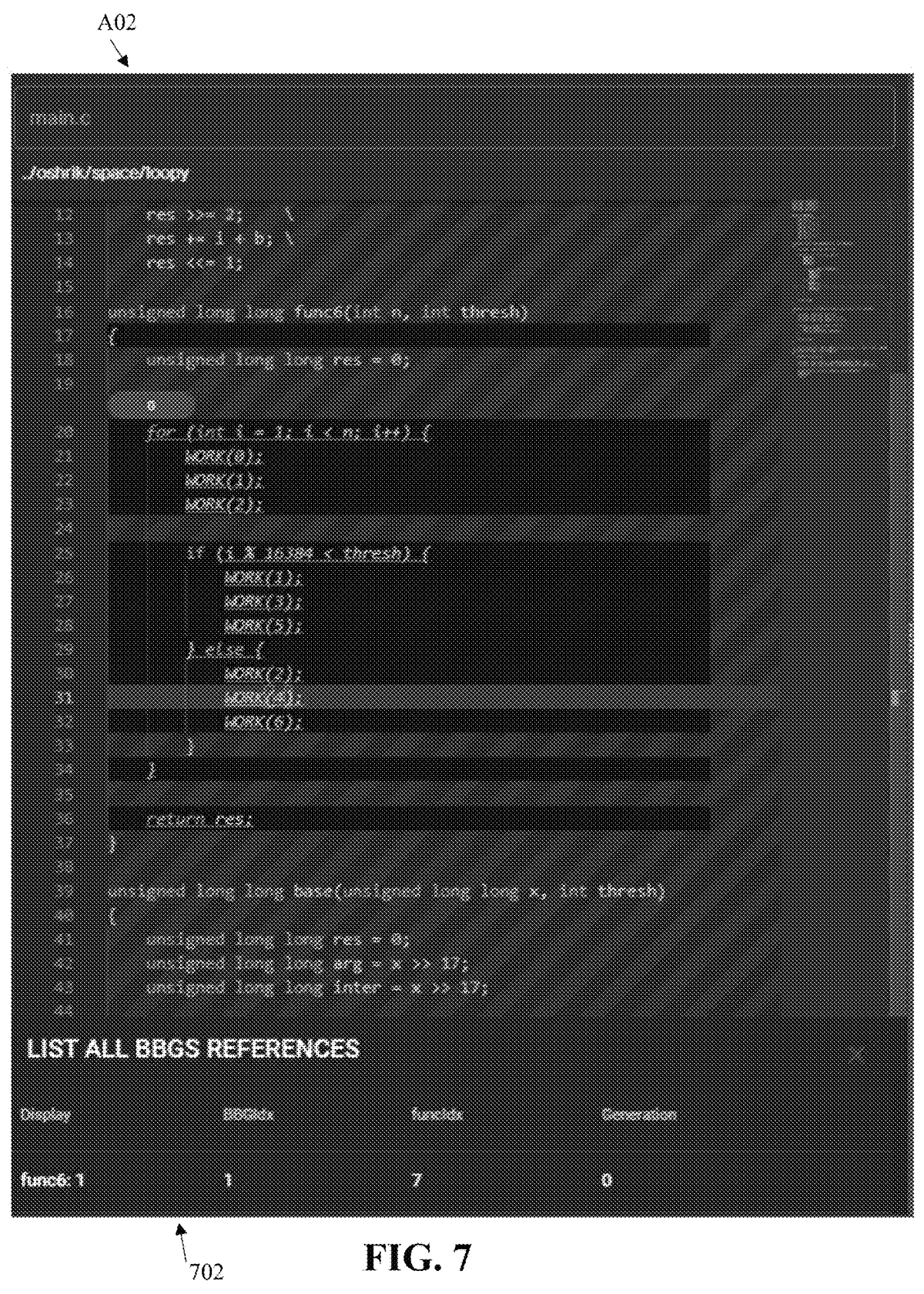

FIG. 7 is a schematic of the GUI of FIG. 5, presenting an example for the compute blocks references table that is presented in response to a selection of a portion of the code that is highlighted, in accordance with some embodiments of the present invention;

DETAILED DESCRIPTION

Figure 1:
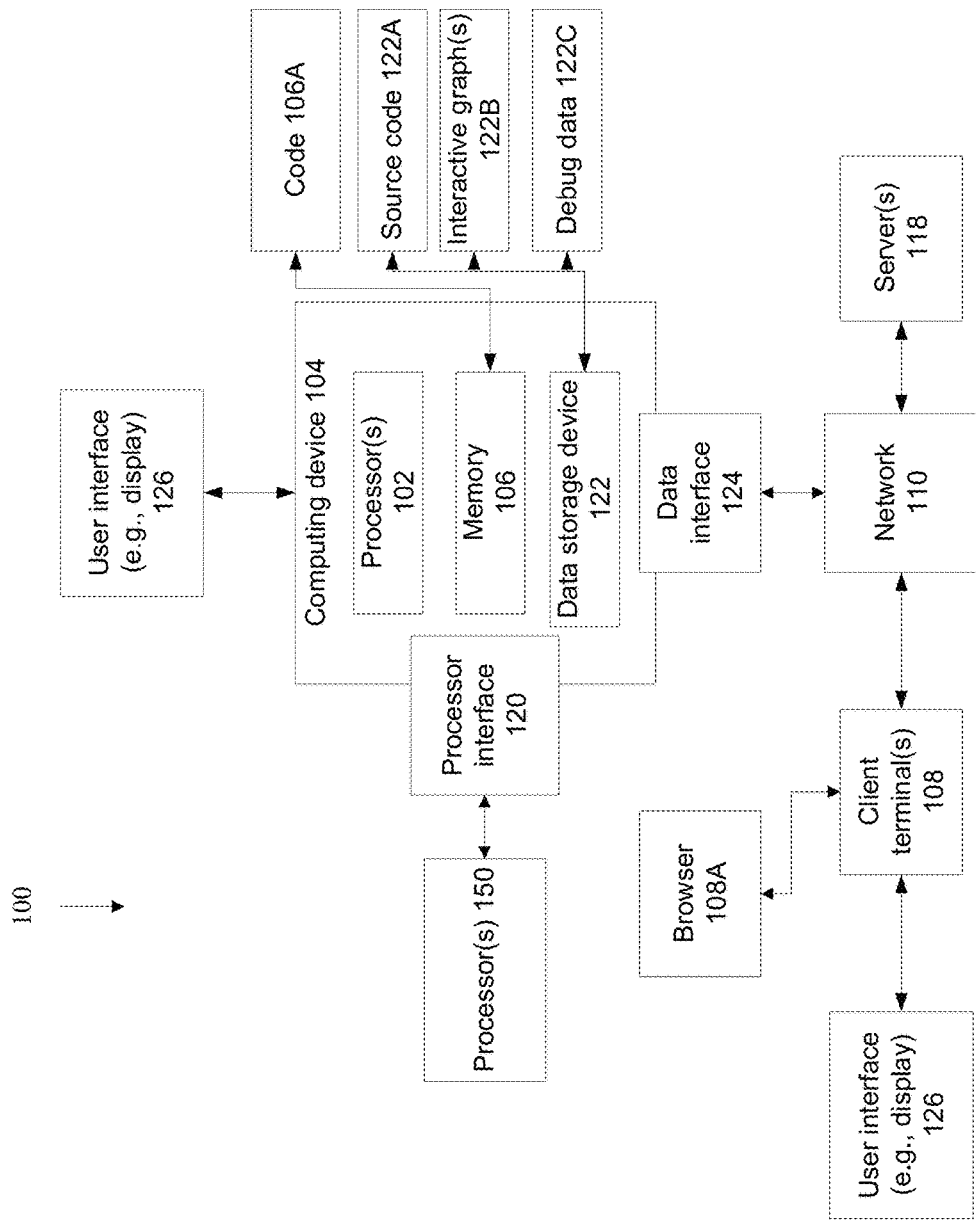
FIG. 1 is a flowchart of an exemplary method of operating a GUI simultaneously presenting source code and an interactive graph, in accordance with some embodiments of the present invention.

The present invention, in some embodiments thereof, relates to user interfaces and, more specifically, but not exclusively, to user interfaces for navigating code-graphs of a source code, executed by a processor, optionally a dataflow processor.

As used herein, the term dataflow processor is not necessarily limiting, and is used as an exemplary embodiments. Embodiments of the GUI described herein may relate to other processors, which may be non-dataflow processors. The GUI may, for example, present mappings between portions (e.g., user selected) of the source code and corresponding mapped portions of the interactive graph of lower level and/or intermediate representations of the source code mapped to physical configurable elements of the processor for execution of the corresponding mapped portion of the source code by a processor that is not necessarily a dataflow processor. The GUI may present mappings between the portions of code and corresponding mapped partially-lowered non-dataflow code, i.e., intermediate representations used in the process of compiling code into machine-executable instructions, for execution by a processor that is not necessarily a dataflow processor. For example, portions of an abstract syntax graph (ASG), intermediate representation (IR), and/or selection directed acyclic graph (SelectionDAG) mapped to components of the hardware of the non-dataflow processor executing the portions of the ASG, IR, and/or SelectionDAG may be presented in the GUI.

As used herein, the term dataflow processor may sometimes be interchanged with the term processor or non-dataflow, for example, in embodiments of the GUI that presents mapping between portions (user selected) source code and interactive graphs of lower level and/or intermediate representations of the source code mapped to physical configurable elements of the processor for execution of the corresponding mapped portion of the source code, the code may be for execution on a dataflow processor or on a non-dataflow processor.

As used herein, the term processor may sometimes refer to a dataflow processor and/or a non-dataflow processor.

As used herein, the term dataflow with reference to edges between nodes and/or links between configuration elements is not necessarily limiting, and is used as an exemplary embodiments. The term dataflow with reference to edges between nodes and/or links between configuration elements may refer to dependencies, for example, control flow, and/or other types of dependencies, as described herein. The term "dataflow", used with reference to edges between nodes and/or links between configuration elements, may be interchanged with the term "dependencies" and/or other types of dependencies.

An aspect of some embodiments of the present invention relates to systems, methods, computing devices, and/or code instructions (stored on a data storage device and executable by one or more processors) for operating a graphical user interface (GUI) presenting a representation of code for execution by a processor, optionally a dataflow processor. Alternatively, in another example, the processor is a non-dataflow processor. A source code (e.g., of a program) is presented in the GUI simultaneously with an interactive graph. The interactive graph may be of a lower level representation and/or an intermediate representation of the source code, for example, IR, ASG, and/or selectionDAG. The interactive graph includes multiple nodes connected by edges representing the source code mapped to physical configurable elements of the processor. Each physical configurable element is configurable for executing one or more selected operations. Node(s), optionally each node and/or individual nodes, represent one or more operation mapped to physical configurable elements. Edges between nodes represent dependencies (e.g., dataflow, control flow) between the operations, mapped to physical dependency (e.g., dataflow, control flow) links between the physical configurable elements. A user selection of a portion of the source code is received via the GUI. One or more nodes and/or edges of the interactive graph corresponding to the user selected portion of the source code are identified. The GUI is updated for visually distinguishing the identified node(s) and/or edge(s) of the interactive graph that correspond to the user selected portion of the source code, for example, by highlighting, color coding, underlining, and the like. The visually distinguished node(s) represent a mapping to certain physical configurable elements. The visually distinguished edge(s) represent certain dependency (e.g., dataflow, control flow) links between the certain physical configurable elements of the processor configured to execute the user selected portion of the source code.

An aspect of some embodiments of the present invention relates to systems, methods, computing devices, and/or code instructions (stored on a data storage device and executable by one or more processors) for operating a GUI presenting a representation of code for execution by a processor. A source code (e.g., of a program) is presented in the GUI simultaneously with an interactive graph. A user selection of node(s) and/or edge(s) of the interactive graph is received via the GUI. The node(s) and/or edge(s) of the interactive graph represent a mapping to certain physical configurable elements and/or certain dependency (e.g., dataflow, control flow) links between the certain physical configurable elements of the processor configured to execute a portion of the source code. The portion of the source code corresponding to the user selected node(s) and/or edge(s) is identified. The GUI is updated for visually distinguishing the portion of the source code.

An aspect of some embodiments of the present invention relates to systems, methods, computing devices, and/or code instructions (stored on a data storage device and executable by one or more processors) for operating a GUI presenting a schematic of a processor. The schematic of the processor includes configurable elements, optionally organized as multiple computational clusters. Optionally, a source code is simultaneously presented in the GUI with the schematic of the processor. The GUI visually indicates one or more computational clusters which are configured for executing the source code. A user selection of one or more computational clusters executing the source code is received via the GUI. The computational clusters may be a subset of the computational clusters configured to execute the source code, such that the subset of clusters is configured to execute a portion of the source code. The GUI is updated for visually distinguishing a portion of the source code being executed by the computational cluster(s) selected by the user.

An aspect of some embodiments of the present invention relates to systems, methods, computing devices, and/or code instructions (stored on a data storage device and executable by one or more processors) for operating a GUI presenting a representation of code for execution by a processor. A source code (e.g., of a program) is presented in the GUI simultaneously with a projection graph (e.g., a representation of the interactive graph). The projection graph includes nodes connected by edges representing the source code in a representation for execution by the processor. The GUI may present the projection graph as an overlay over configurable elements of the processor. Nodes of the projection graph corresponding to different portions of the source code may be overlaid over corresponding computational clusters of configurable elements of the processor executing respective portions of the source code. Optionally, a user selection of a portion of the source code is received via the GUI. Node(s) and/or edge(s) of the projection graph corresponding to the used selected portion of the source code are identified. The GUI is updated for visually distinguishing the node(s) and/or edge(s) of projection graph corresponding to the used selected portion of the source code. Alternatively or additionally, a user selection of node(s) and/or edge(s) of the projection graph is received via the GUI. A portion of the source code corresponding to the user selected node(s) and/or edge(s) of the projection graph is identified. The GUI is updated for visually distinguishing the portion of the source code corresponding the user selected node(s) and/or edge(s).

At least some implementations described herein address the technical problem of visually presenting correspondence between source code of a program and hardware representation of execution of the source code by a dataflow architecture processor that includes configurable elements. The configurable elements are not processor cores, and do not contain an instruction pipeline and/or instruction set. Rather, the configurable elements are re-configurable to perform one or more operations for a dataflow.

The technical problem may relate to visually presenting the correspondence, for example, for debugging source code, and/or improving performance of the executing source code. At least some implementations described herein improve the technology of GUIs, by enabling visually presenting correspondence between source code of a program and hardware representation of execution of the source code by a dataflow architecture processor.

At least some implementations described herein address the aforementioned technical problem and/or improve the aforementioned technical field, by providing a GUI that simultaneously presents a portion of source code (e.g., of an application written by a programmer) and corresponding nodes of an interactive graph representing the source code as it is executing on the processor. Debug information embedded in the application binary and associated with the graph may be connected to specific graph nodes with specific lines of code. This enables the user to use the GUI to highlight, click and/or interact with the source code and see the matching resources in a processor and/or allow the user to click and interact with the graph and see the matching lines of the source code.

The GUI enables a user, for example, to provide insights into the performance and/or efficiency of the program being executed by the processor. By analyzing the graph, the user may identify bottlenecks and/or optimize the program for better performance. The nodes of the graph of code executed by the processor presented in the GUI mapped to the source code may be used for understanding and/or optimizing data-intensive programs. The GUI may be used for debugging purposes, as it allows users to visualize the data flow through specific lines of code of the program and/or trace the origin of errors. The GUI may provide a visual representation of the program's data dependencies and execution flow, allowing developers to gain deeper insights into the program's behavior and performance.

Tools exist for von Neuomann based processors, for example, GDB, LLDB and Microsoft Windows Debugger (WinDbg). However, such tools cannot be used for dataflow architecture processors.

A dataflow processor and a von Neumann processor are two types of computer architectures that differ in how they process data and instructions. A von Neumann processor is the most common type of processor in modern computers. It uses a sequential processing model where instructions are fetched from memory one at a time and executed in a specific order. The processor has a control unit, an arithmetic logic unit (ALU), and a memory unit, which work together to execute instructions. In a von Neumann architecture, the same memory is used for both data and instructions. In contrast, a dataflow processor uses a different processing model where instructions are executed as soon as their input data is available. The dataflow processor does not have a specific order in which it executes instructions, and it operates based on the availability of data. The processor has multiple execution units that can work in parallel, and each unit is responsible for executing a specific operation, such as addition or multiplication. In a dataflow architecture, data and instructions are kept separate.

The main difference between the two architectures is their approach to instruction execution. In a von Neumann architecture, instructions are executed sequentially, while in a dataflow architecture, instructions are executed as soon as their input data is available. The dataflow architecture does not include a processor pipeline and/or instruction set, but rather works on one or more threads, optionally simultaneously. The dataflow architecture may be better suited for tasks that require high parallelism and data-intensive operations, such as multimedia processing, while the von Neumann architecture is better suited for general-purpose computing tasks.

Contrary to an instruction set architecture model, where the CPU executes instructions fetched from memory and writes results back to memory, a dataflow architecture model does not fetch instructions from memory. Instead, logic blocks are configured in advance to perform a specific action (for example, add or subtract) and only that action. In a dataflow architecture, multiple data streams flow through the logic blocks.

The source code of the application program is represented as a graph of connected nodes, which represents how an underlying dataflow processor executes the code. Each node may have many pieces of information attached to it, for example, the node type, the connectivity to other nodes, special traits of the node (such as conditional execution or type of output), for example, as described herein. The user may be interested in the nodes for many different tasks, for example, (a) seeing the location of different node types and mapping them to the underlying hardware resources (b) seeing all nodes with active runtime information, (c) seeing the connections between different groups of nodes.

Many blocks of code may be large and contain hundreds or thousands of distinct nodes when represented as a graph. The technical problem may relate to providing a visual representation for a user for understanding and/or extracting meaning from the information. Large amount of information is both actionable by a user and/or requires significant amount of computational resources needed to present it. A projection graph, as described herein, visually represents the layout of a physical dataflow processor and how the source code program maps onto the different amounts of execution units and their physical location on the dataflow processor. Moreover, as described herein, the GUI presents the connection between different interactive graphs and how program data is transferred between them.

A user may use the GUI to understand the connection between the source code of the program and execution on hardware which may be affected by differences in the location of the different control blocks.

At least some embodiments described herein improve over existing approaches. For example, one simple approach which is impractical, is an all or nothing approach, meaning either displaying the entire processor hardware or displaying the entire program source code. Theoretically, the user would need to manually try and determine the mapping between source code and hardware resources. However, such manual mapping is practically impossible for a human to performance, since the user would be overwhelmed with information as a processor may have tens of thousands of unique resources configured that may or may not overlap with application source code.

At least some implementations described herein address the aforementioned technical problem and/or improve the aforementioned technical field and/or improve upon the aforementioned existing approaches, by providing a GUI designed to enables users to dynamically pick the areas of the application that they are interested in investigating, such as a particular function, execution block and/or line of code, and see the configured execution resources. For example, a user may focus on how a particular computation was transformed to dataflow, click on the relevant source code and the user interface highlights the matching execution resources on the graph to the exclusion of other nodes. Another example may be a user using the GUI for investigating which code does a particular memory access node serve and/or may highlight a specific memory node in the dataflow representation and have the user interface focus on the specific lines of code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
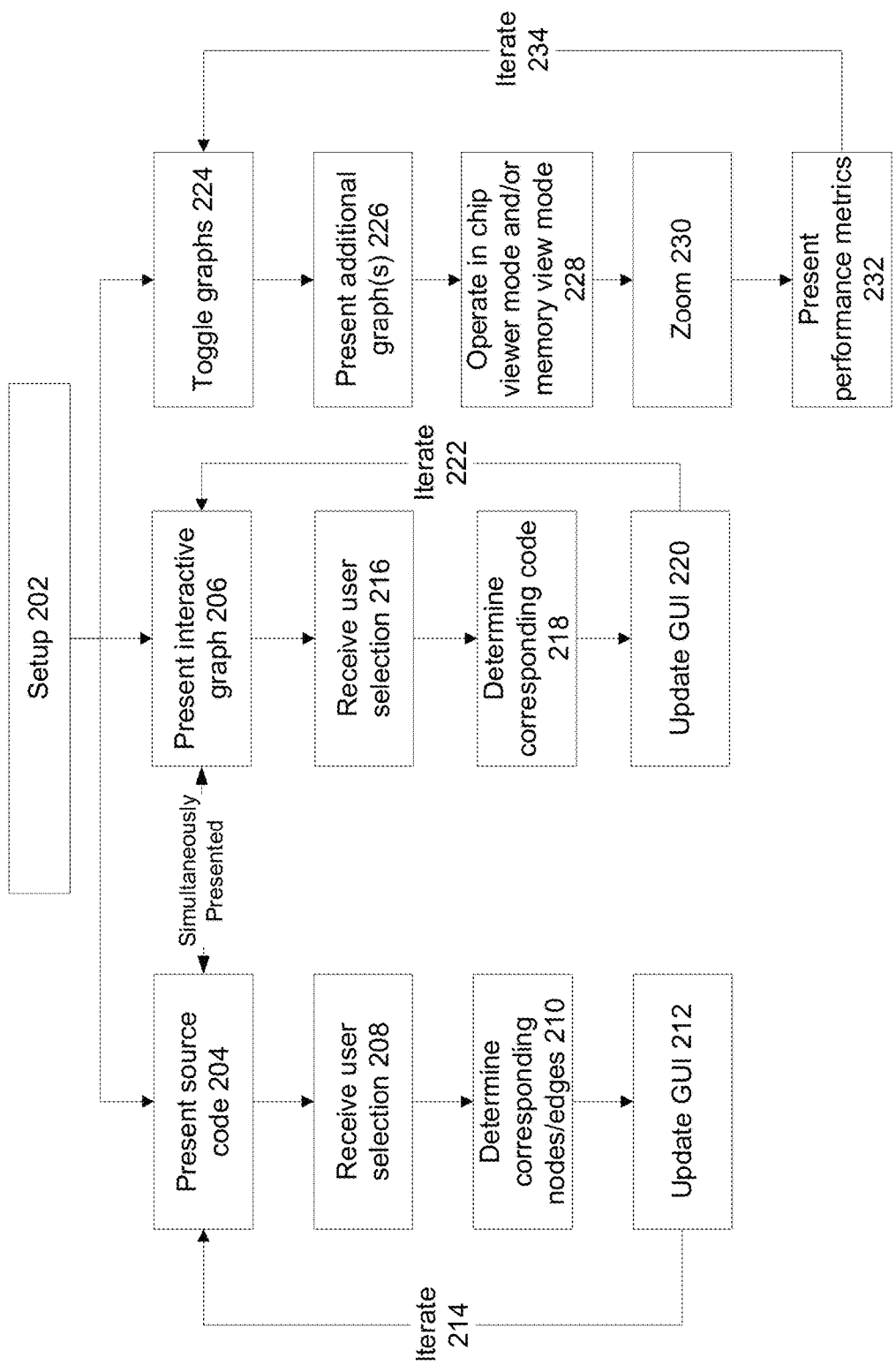
FIG. 2 is a flowchart of an exemplary method for operating a GUI that simultaneously presents source code mapped to an interactive graph representation for execution by a processor, in accordance with some embodiments of the present invention.
Figure 3:
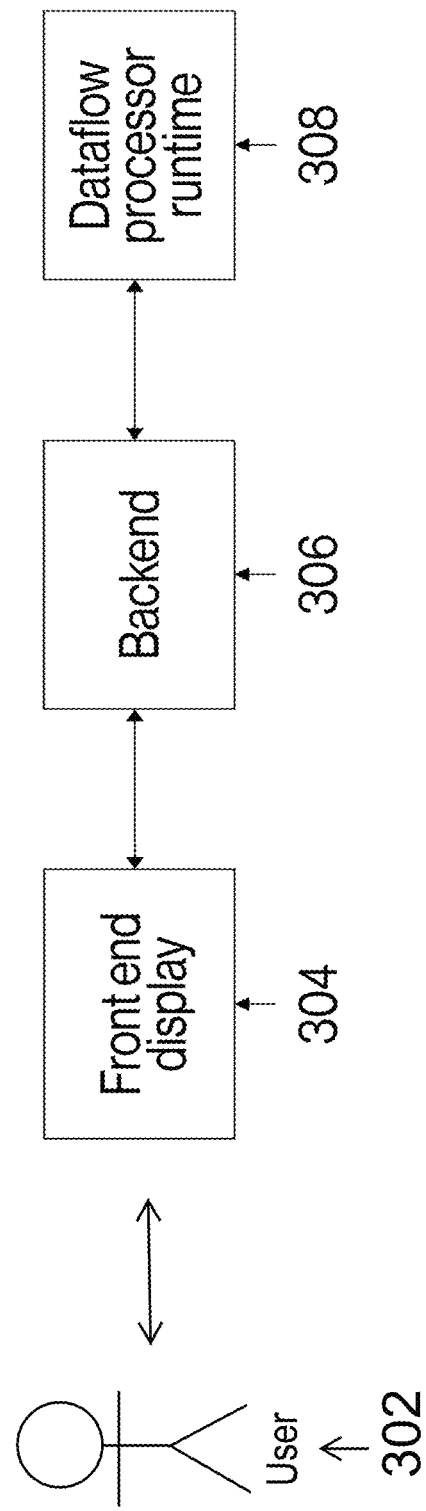
FIG. 3 is a schematic of an exemplary front end-back end architecture for implementing the GUI, in accordance with some embodiments of the present invention.
Figure 4:
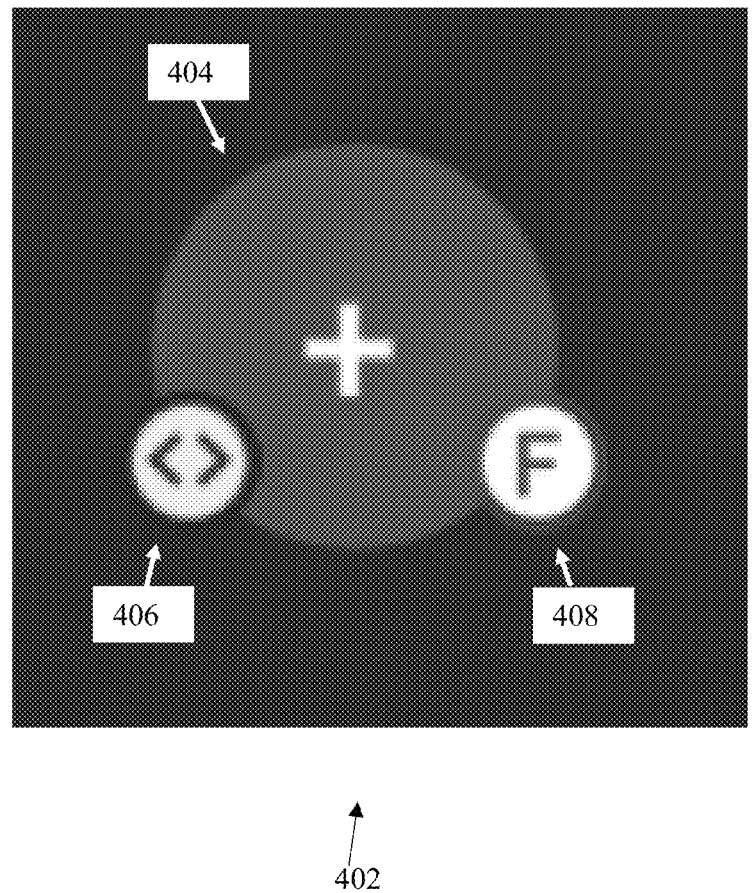
FIG. 4 is a schematic of an exemplary node of the interactive graph presented in the GUI, in accordance with some embodiments of the present invention.
Figure 5:
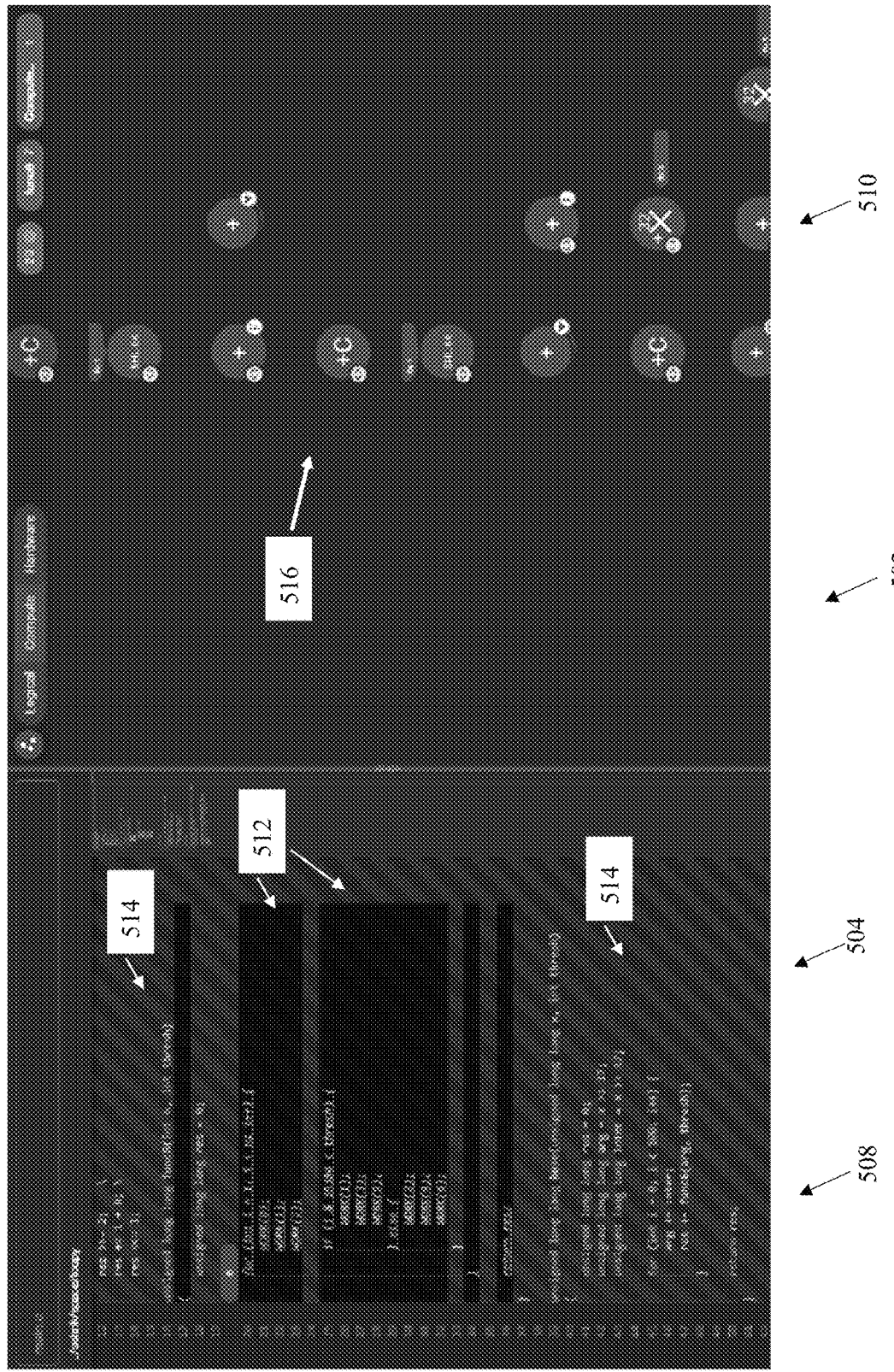
FIG. 5 is a schematic of an exemplary GUI that simultaneously presents source code and an interactive graph, in accordance with some embodiments of the present invention.
Figure 6:
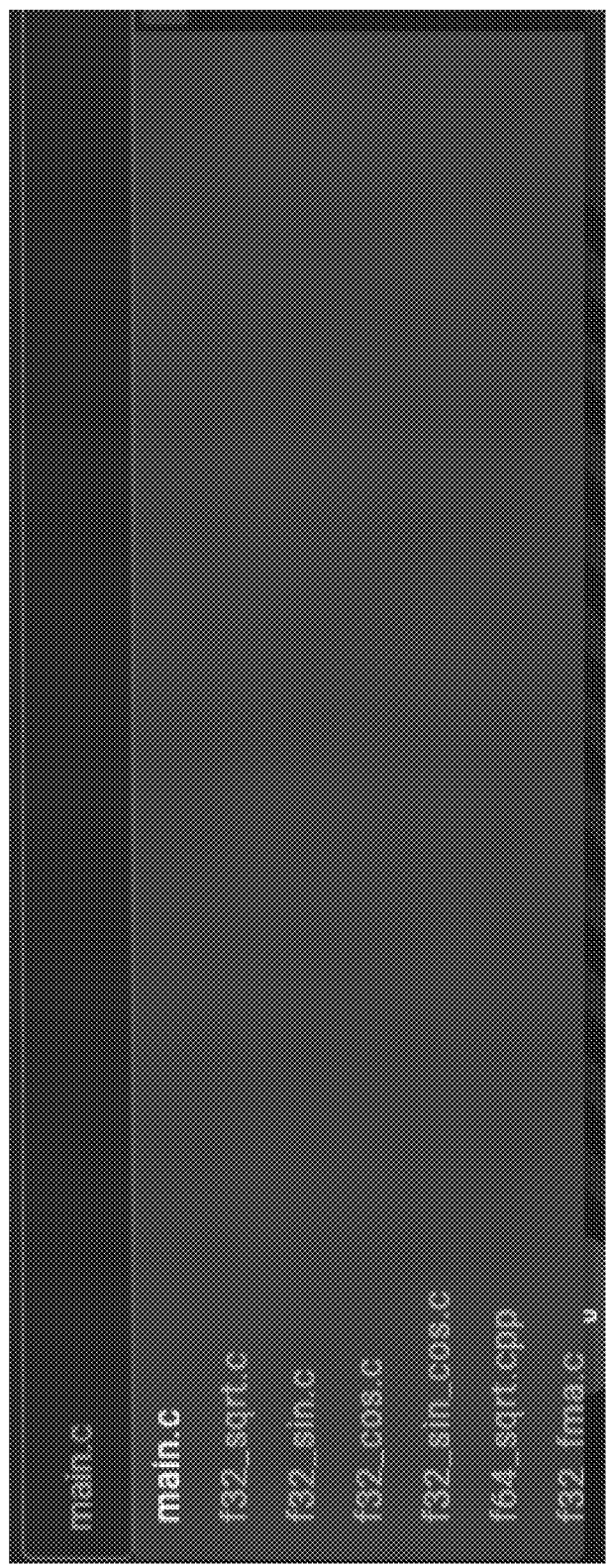
FIG. 6 is a schematic of a list of files presented in response to a user click in the GUI, in accordance with some embodiments of the present invention.
Figure 8:
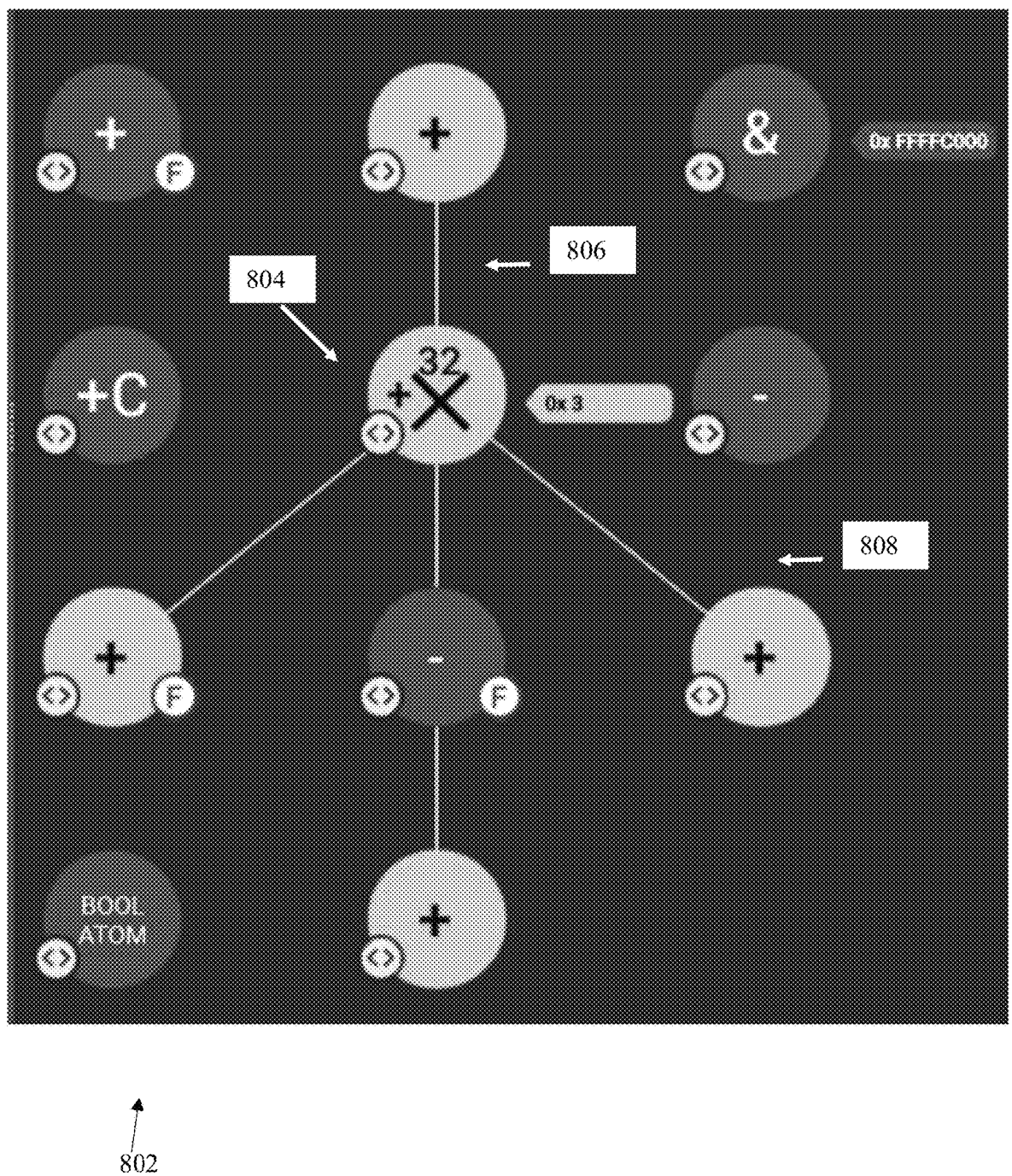
FIG. 8 is a schematic depicting a response to a user selection of a node of the interactive graph, in accordance with some embodiments of the present invention.
Figure 9:
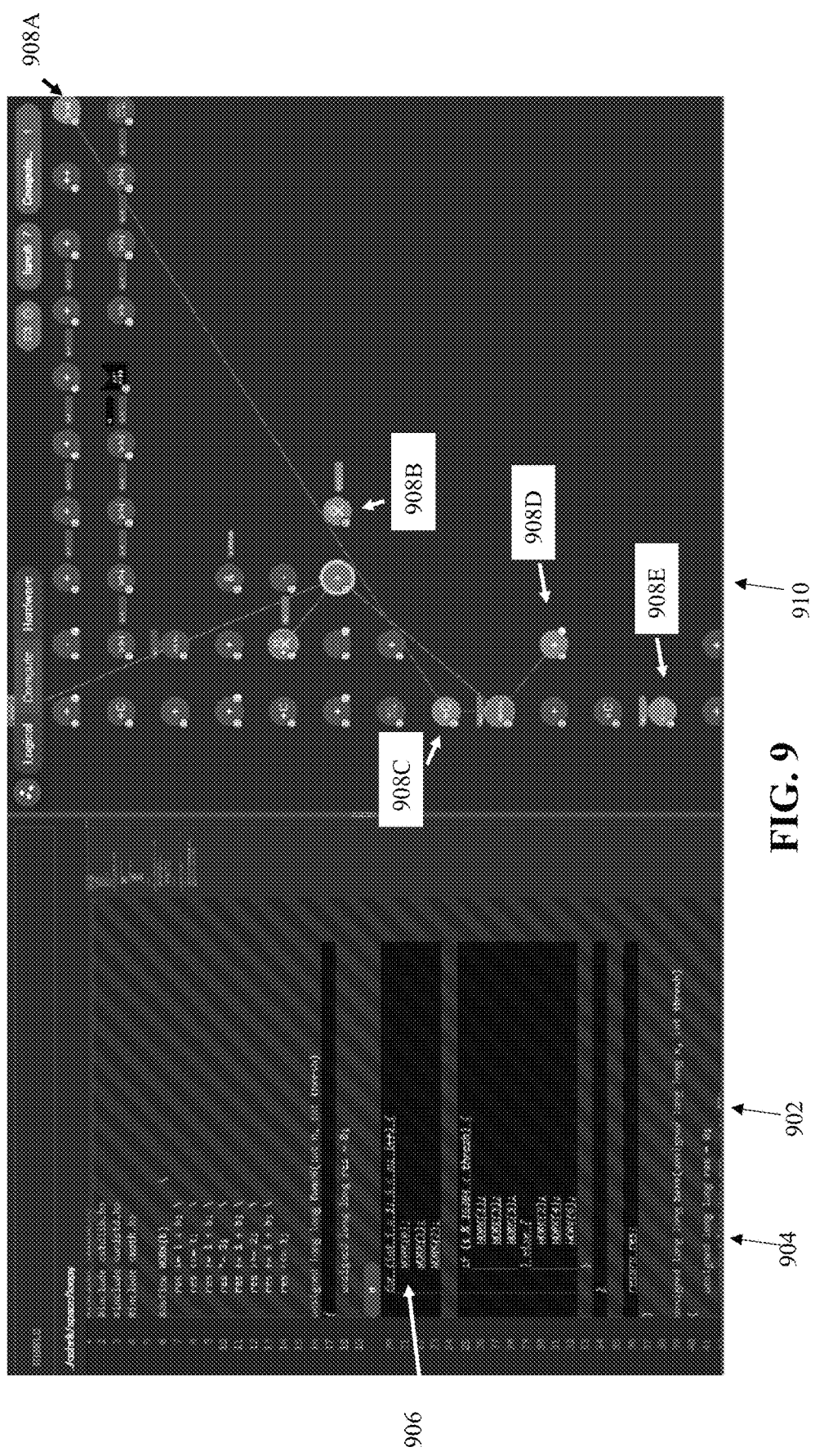
FIG. 9 is a schematic of a GUI depicting correspondence between a certain line of code and corresponding nodes, in accordance with some embodiments of the present invention.
Figure 10:
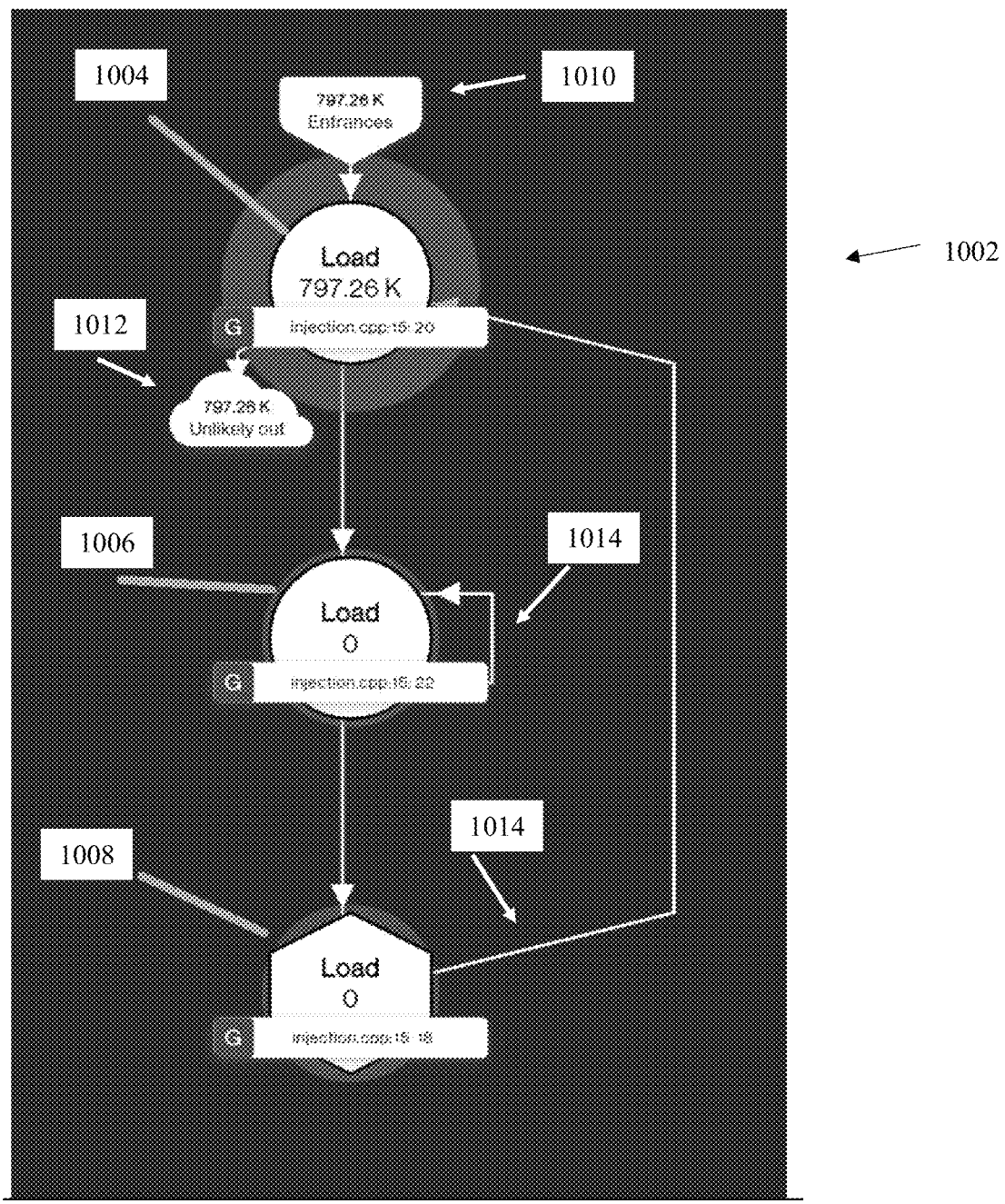
FIG. 10 is a schematic of a GUI depicting a set of connected nodes each representing an independent graph and connections between the graphs, in accordance with some embodiments of the present invention.
Figure 11:
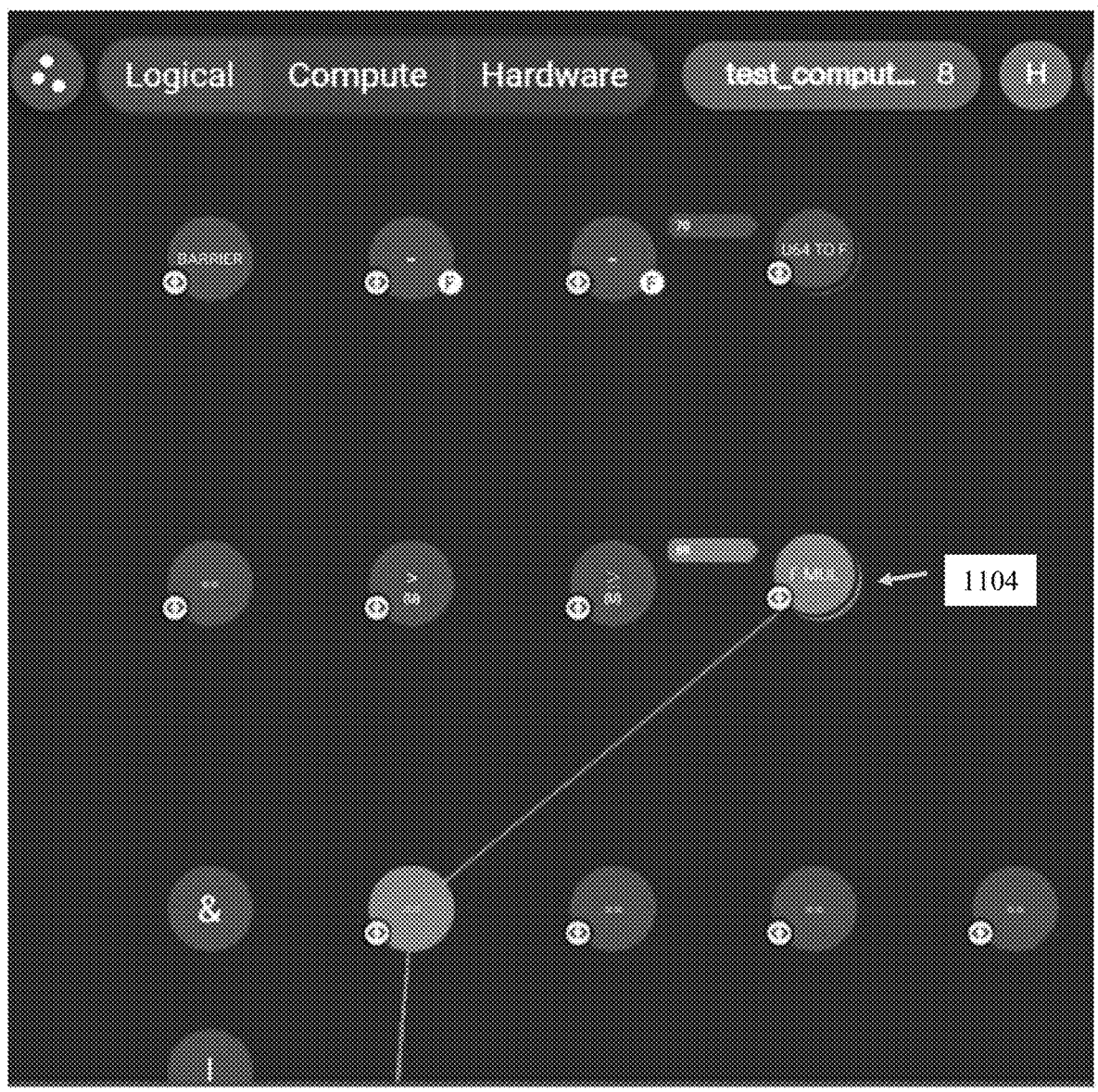
FIG. 11 is a schematic of a GUI of a logical view of the interactive graph, in accordance with some embodiments of the present invention.
Figure 12:
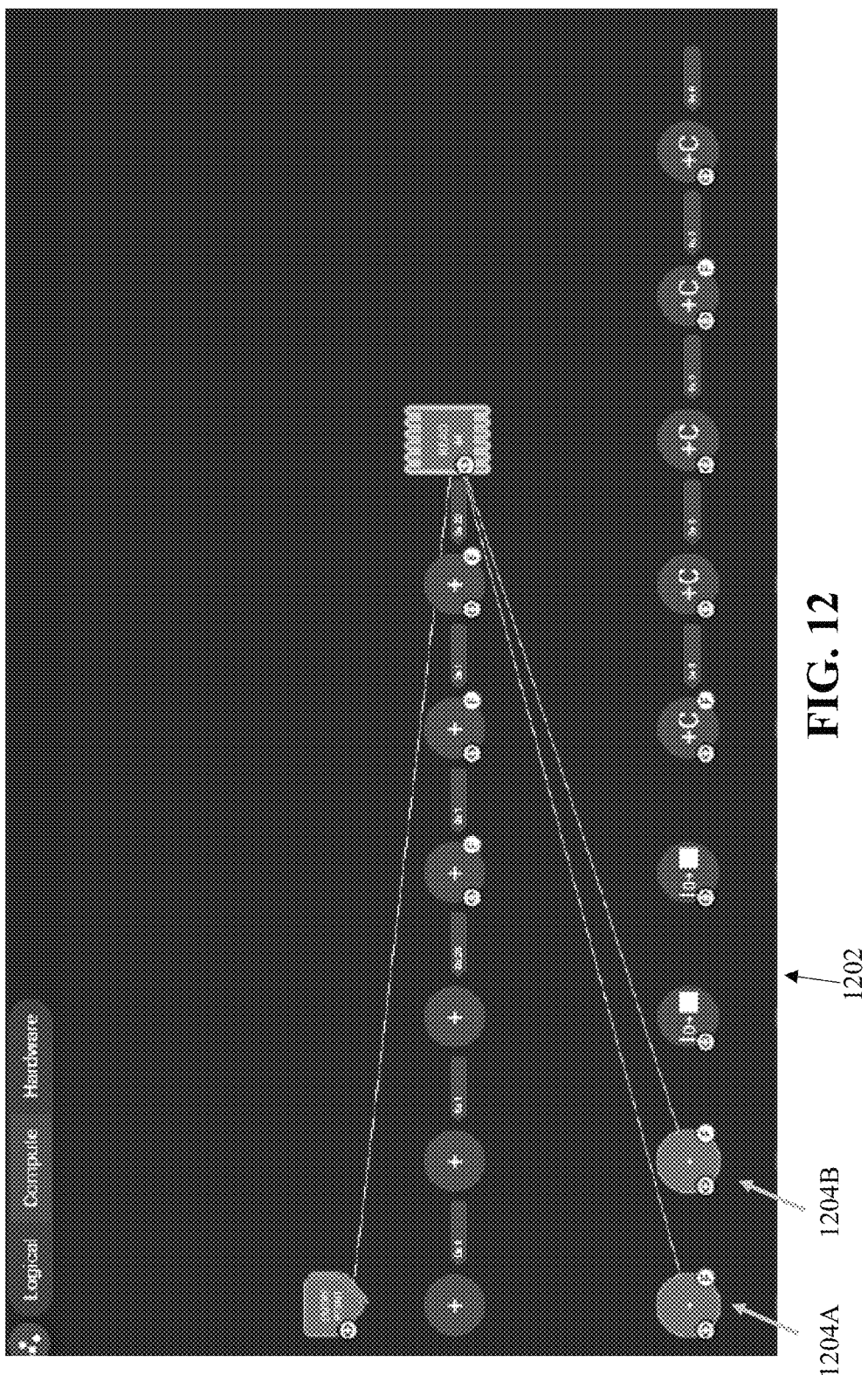
FIG. 12 is a schematic of a GUI of a compute view of the interactive graph, in accordance with some embodiments of the present invention.
Figure 13:
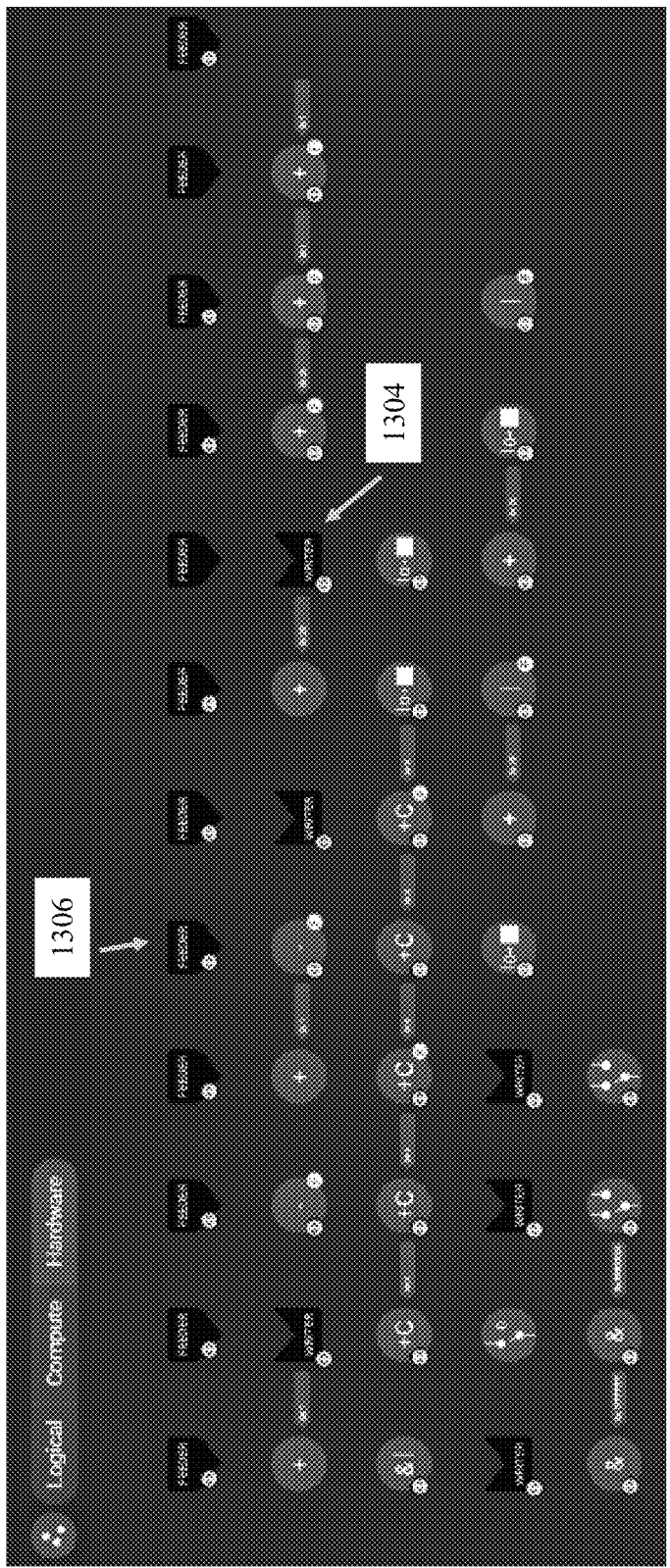
FIG. 13 is a schematic of a GUI of a hardware view of the interactive graph, in accordance with some embodiments of the present invention.
Figure 14:
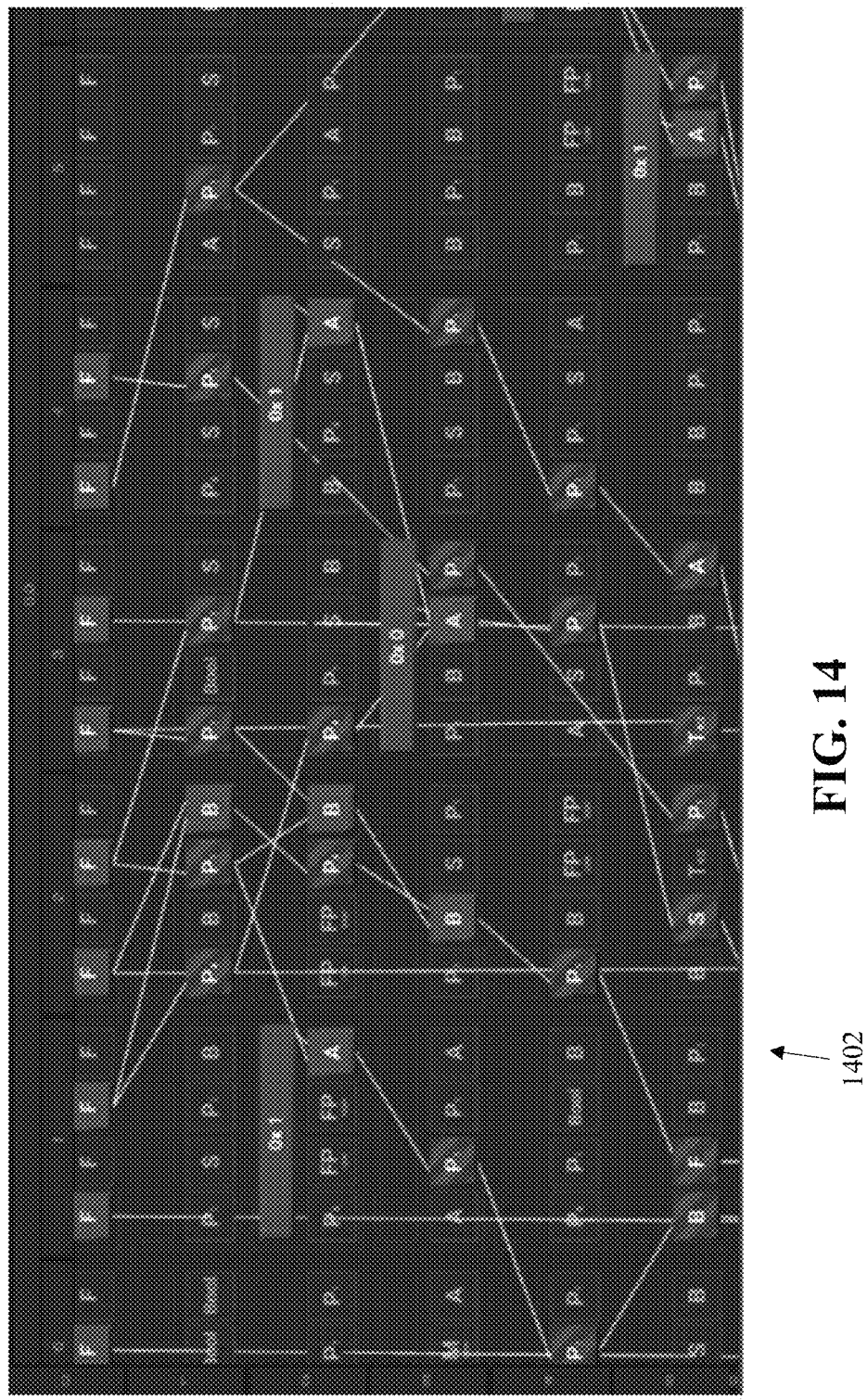
FIG. 14 is a schematic of a GUI of a projection view of the interactive graph, in accordance with some embodiments of the present invention.
Figure 15:
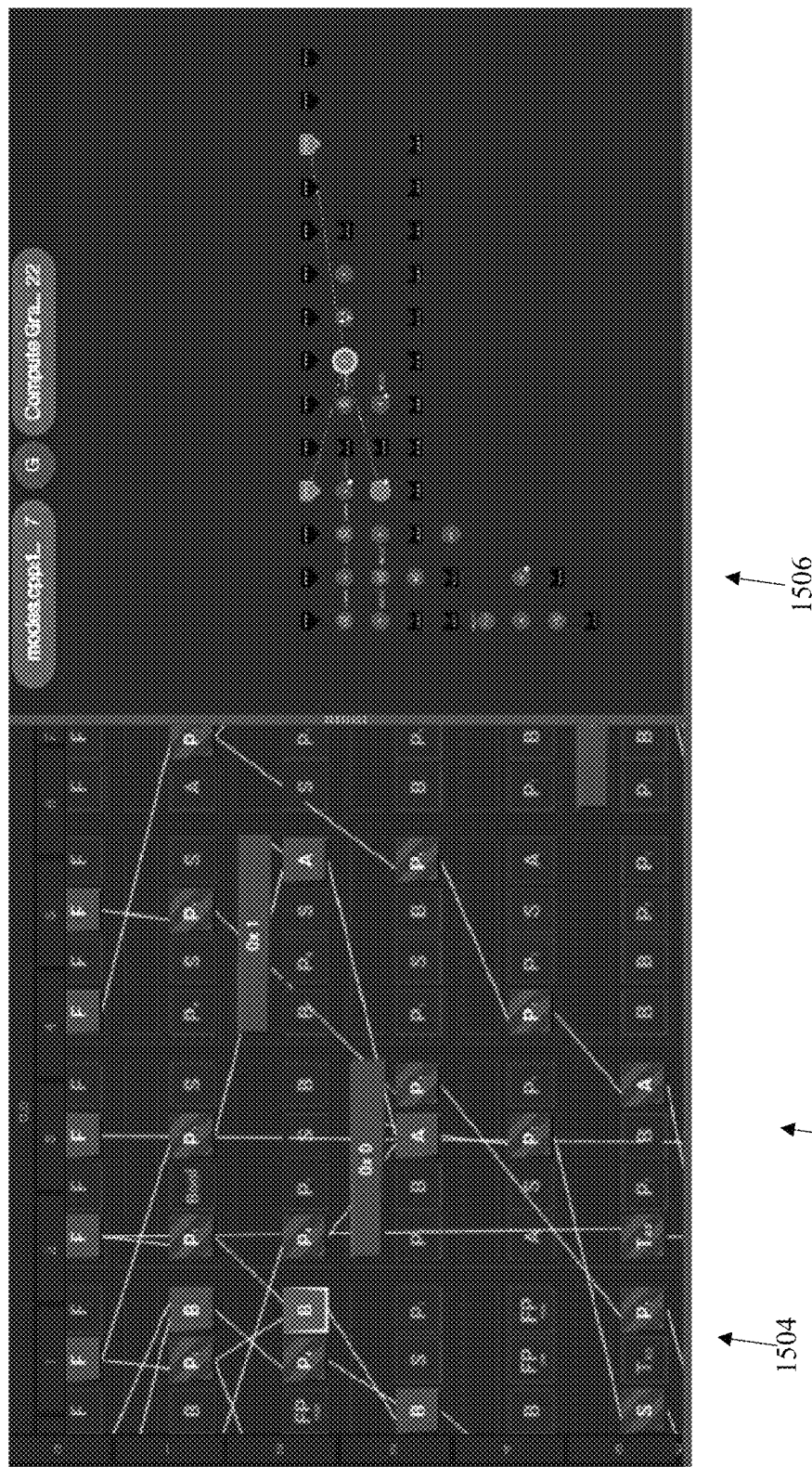
FIG. 15 is a schematic of a GUI depicting a projection view of the interactive graph and another higher level view of abstraction (e.g., logic, compute, hardware) of the interactive graph, in accordance with some embodiments of the present invention.
Figure 16:
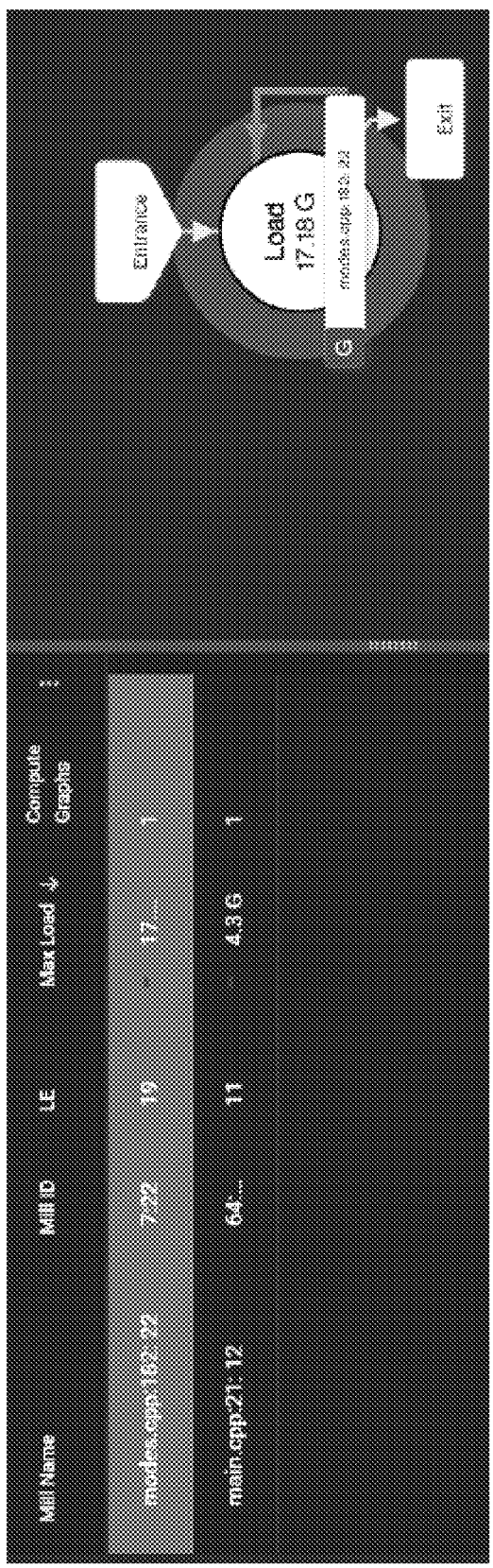
FIG. 16 is a GUI showing connectivity between different dataflow graphs, in accordance with some embodiments of the present invention.
Figure 17:
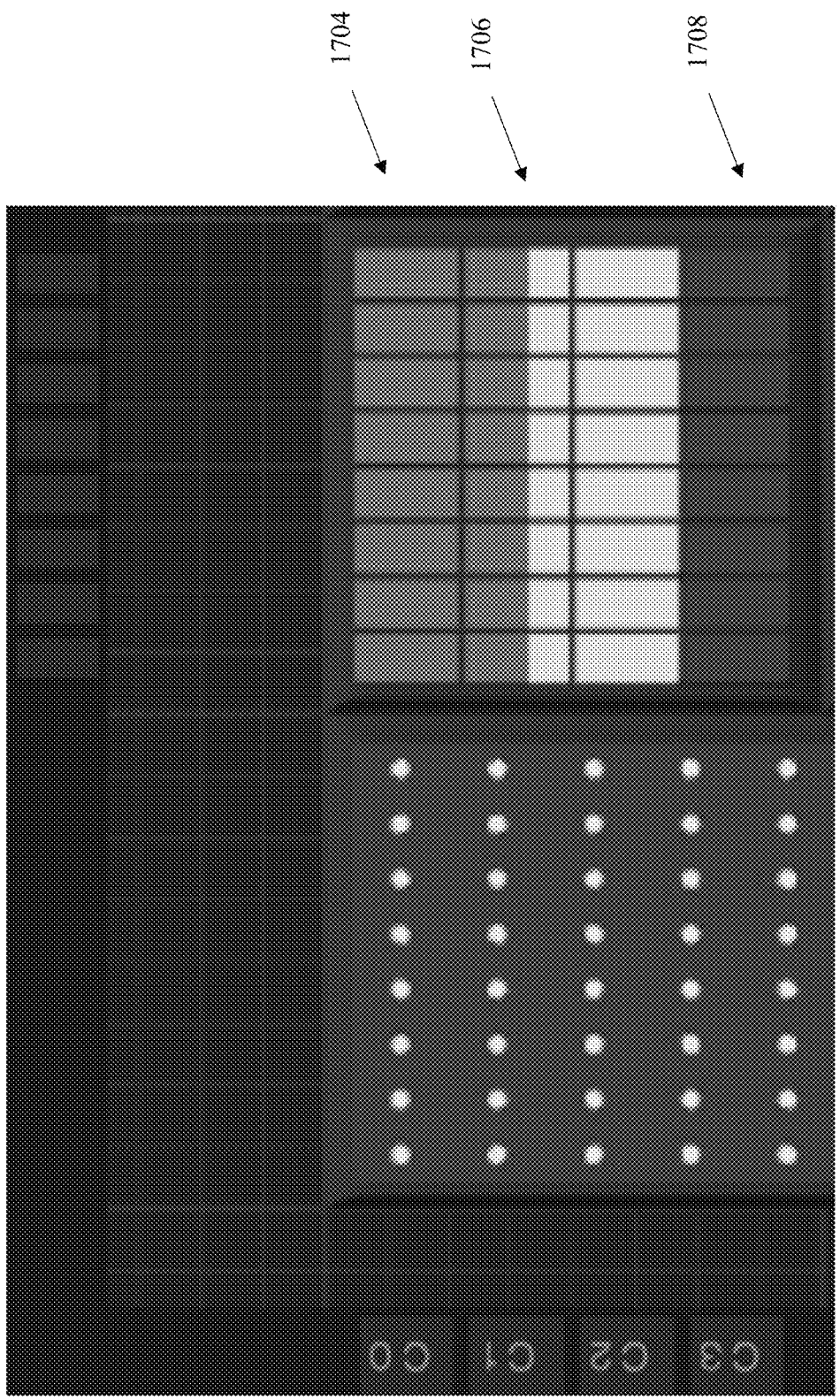
FIG. 17 is a GUI presenting visual indications of utilization of hardware resources of a processor executing a graph corresponding to source code, in accordance with some embodiments of the present invention.
Figure 18:
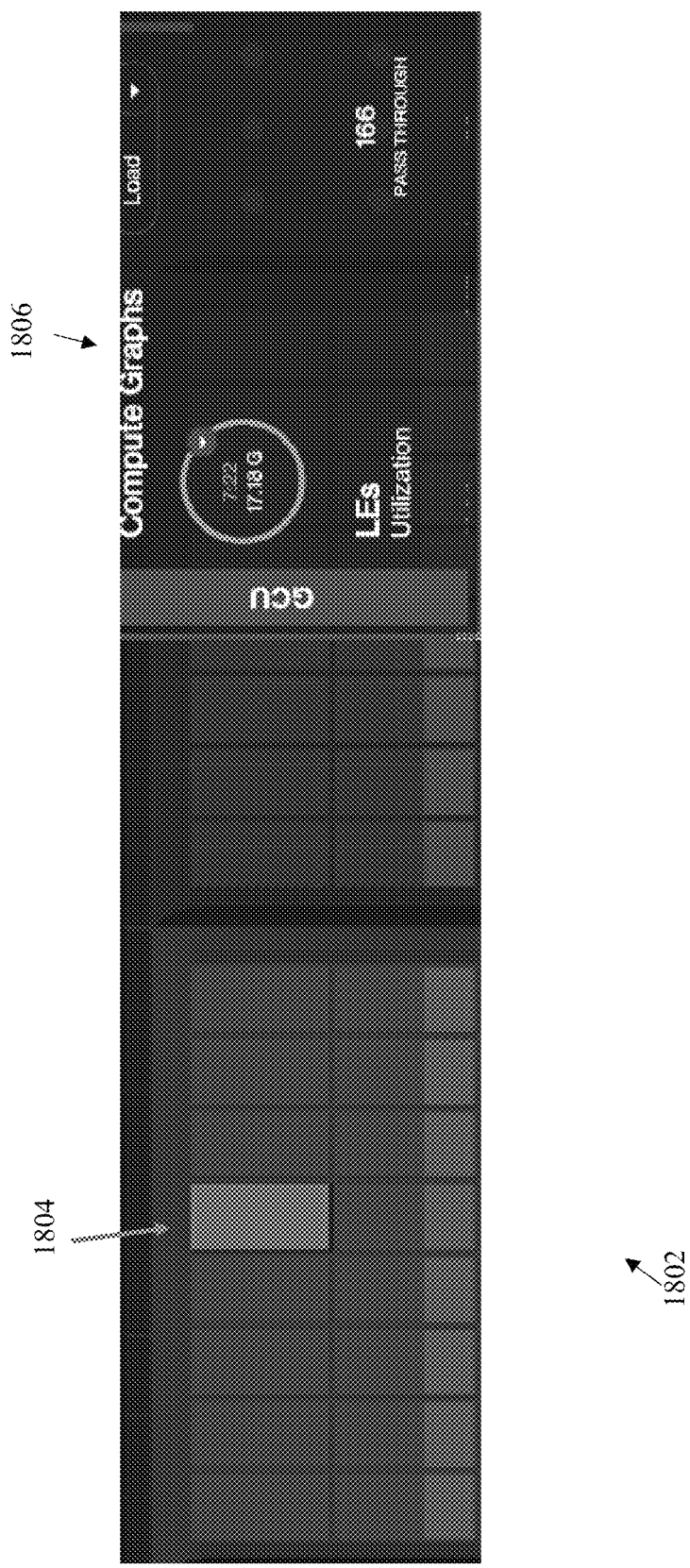
FIG. 18 is a GUI presenting a selection of a certain cluster and a corresponding window indicating which functions are being executed by the cluster and/or utilization of the hardware units of the cluster, in accordance with some embodiments of the present invention.
Figure 19:
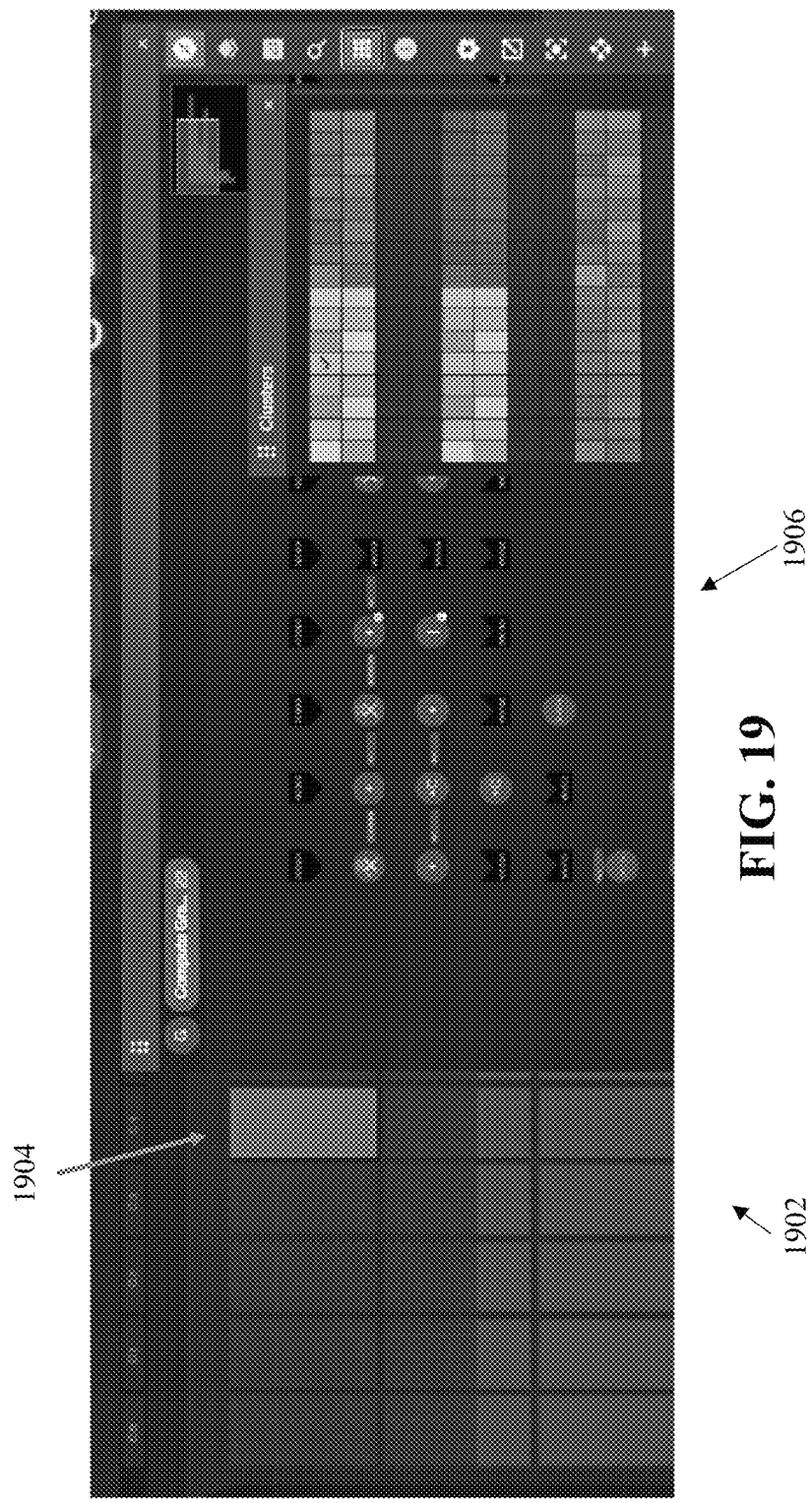
FIG. 19 is a GUI presenting a selection of a certain cluster and corresponding nodes of an interactive graph, in accordance with some embodiments of the present invention.
Figure 20:
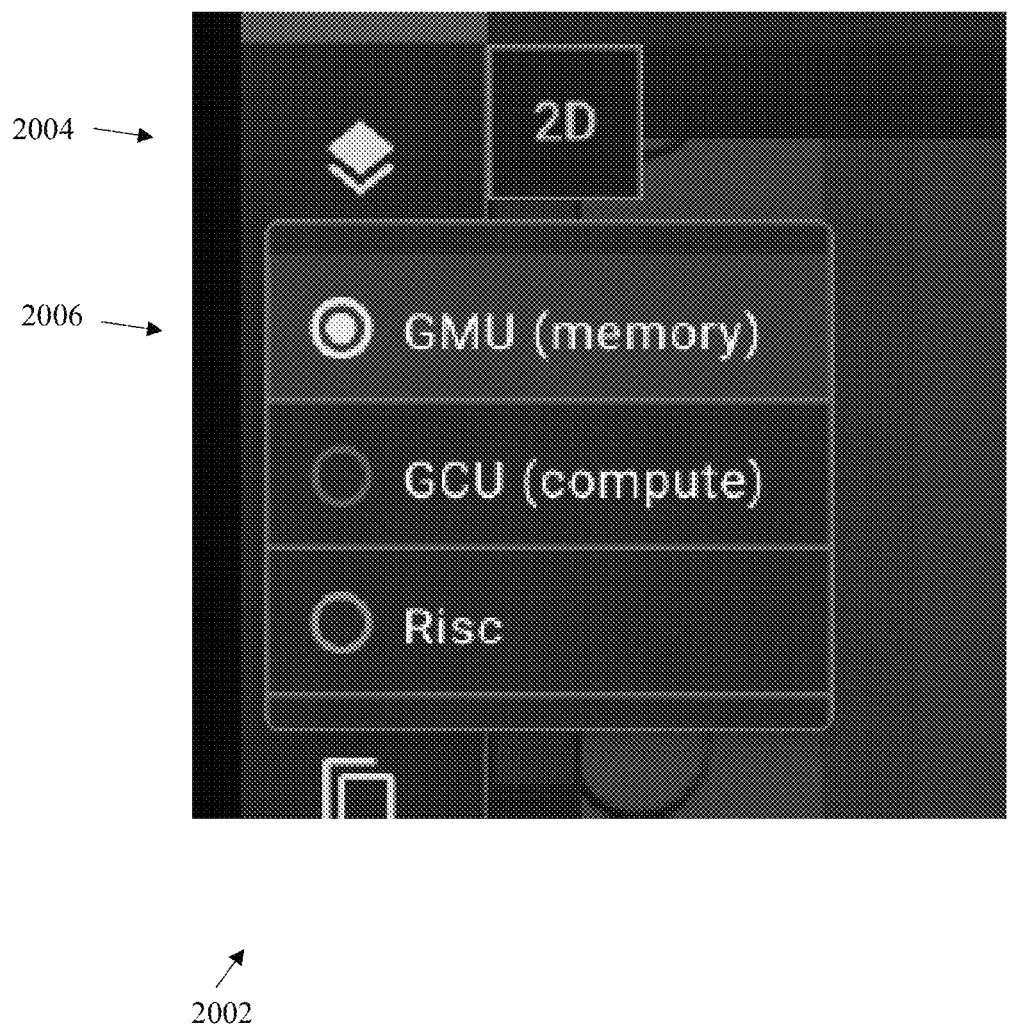
FIG. 20 is a GUI presenting an option for viewing a memory-centric display of the processor, in accordance with some embodiments of the present invention.
Figure 21:
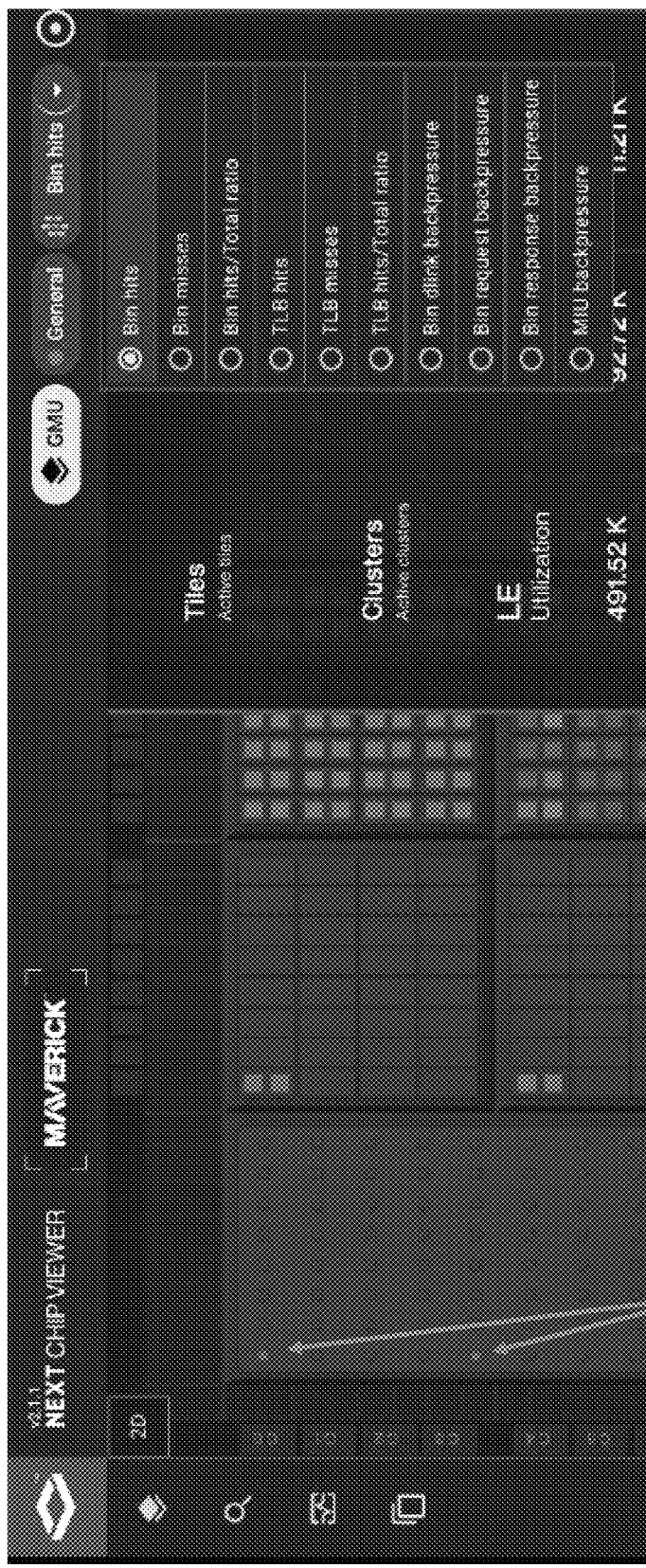
FIG. 21 is a GUI presenting memory elements of the processor, in accordance with some embodiments of the present invention.
Figure 22:
FIG. 22 is a schematic of a GUI presenting a full detail zoom of nodes of the interactive graph, in accordance with some embodiments of the present invention.
Figure 23:
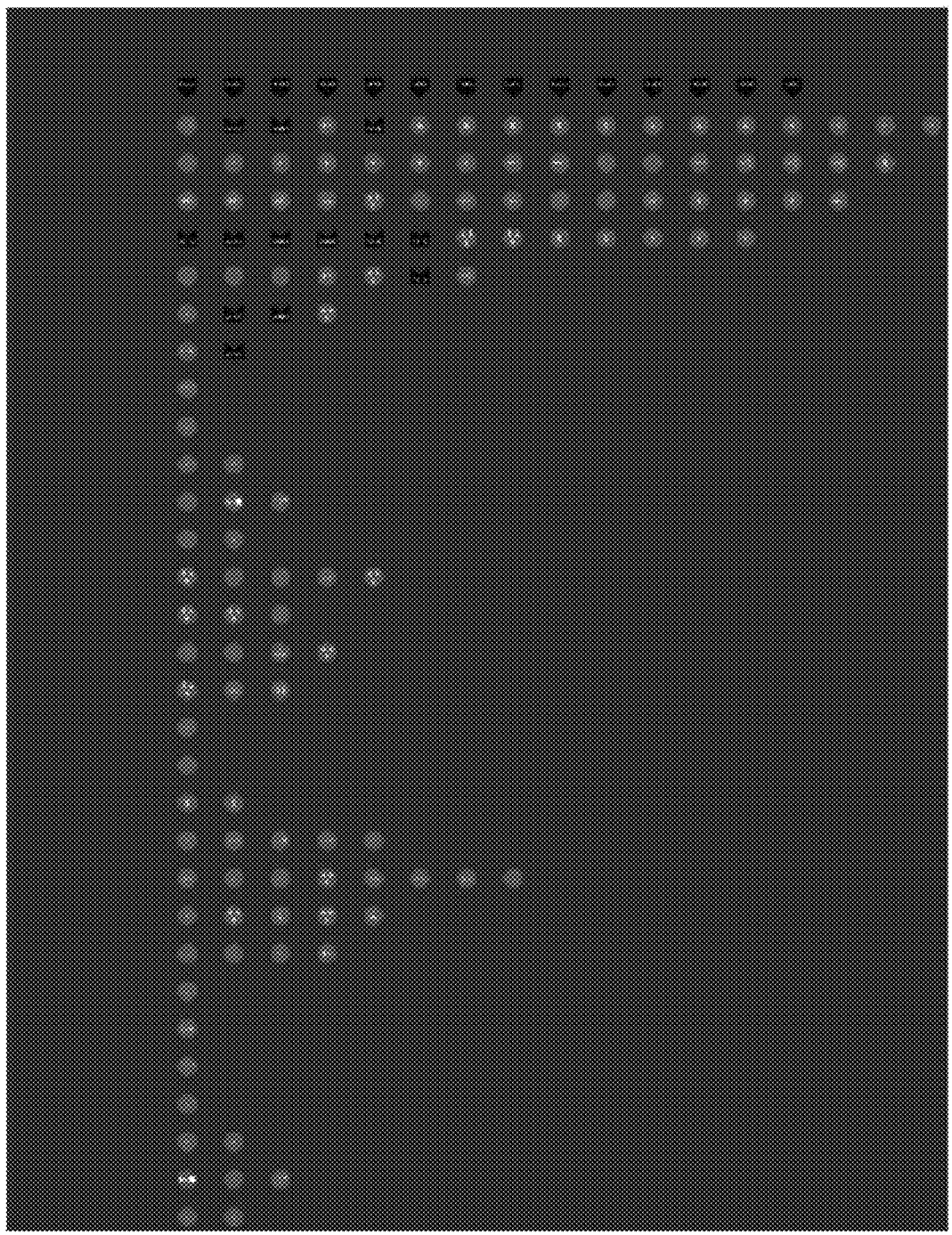
FIG. 23 is a schematic of a GUI presenting a partial detail zoom of nodes of the interactive graph, in accordance with some embodiments of the present invention.
Figure 24:
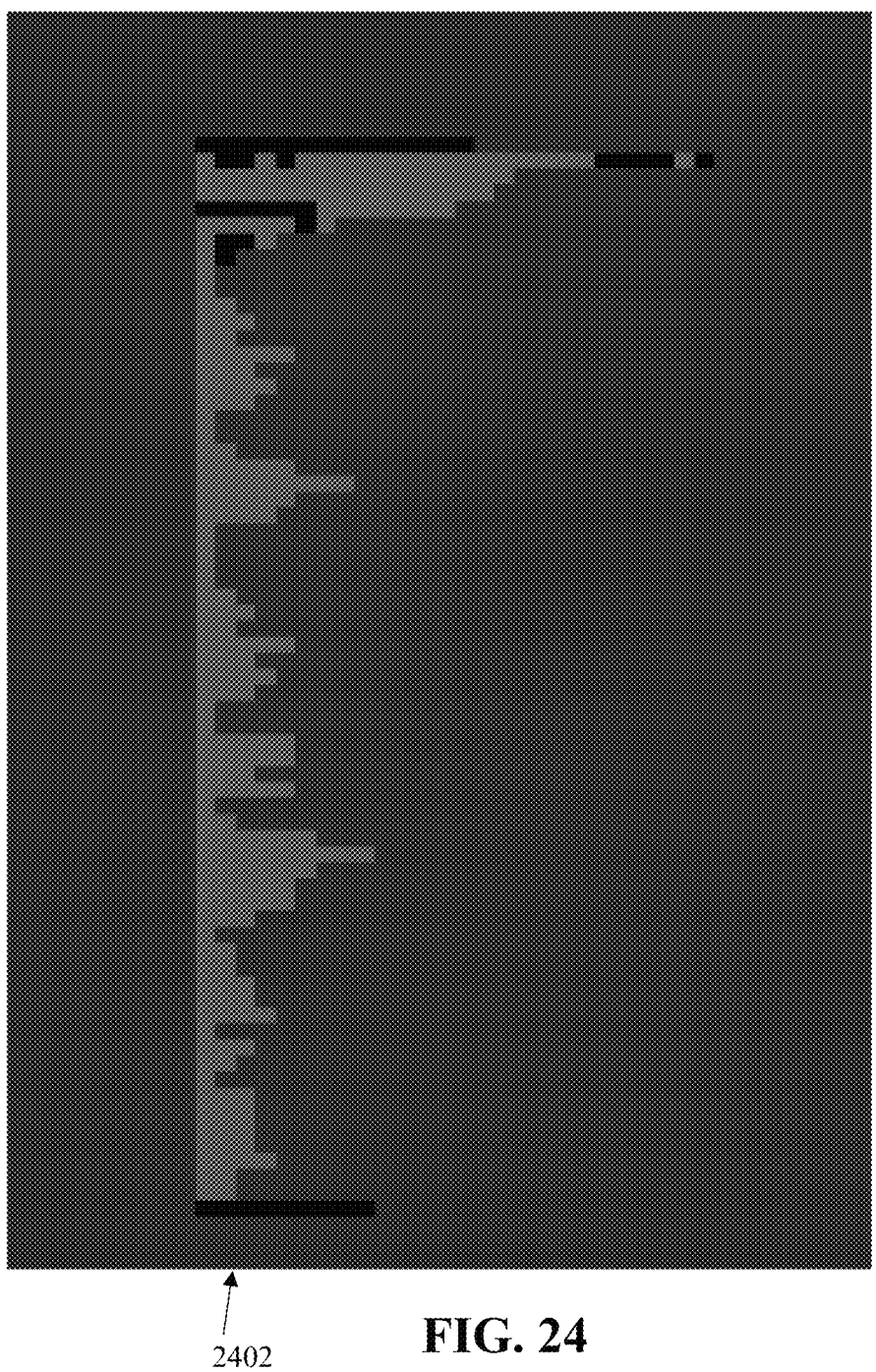
FIG. 24 is a schematic of a GUI presenting a structure level zoom of nodes of the interactive graph, in accordance with some embodiments of the present invention.
Figure 25:
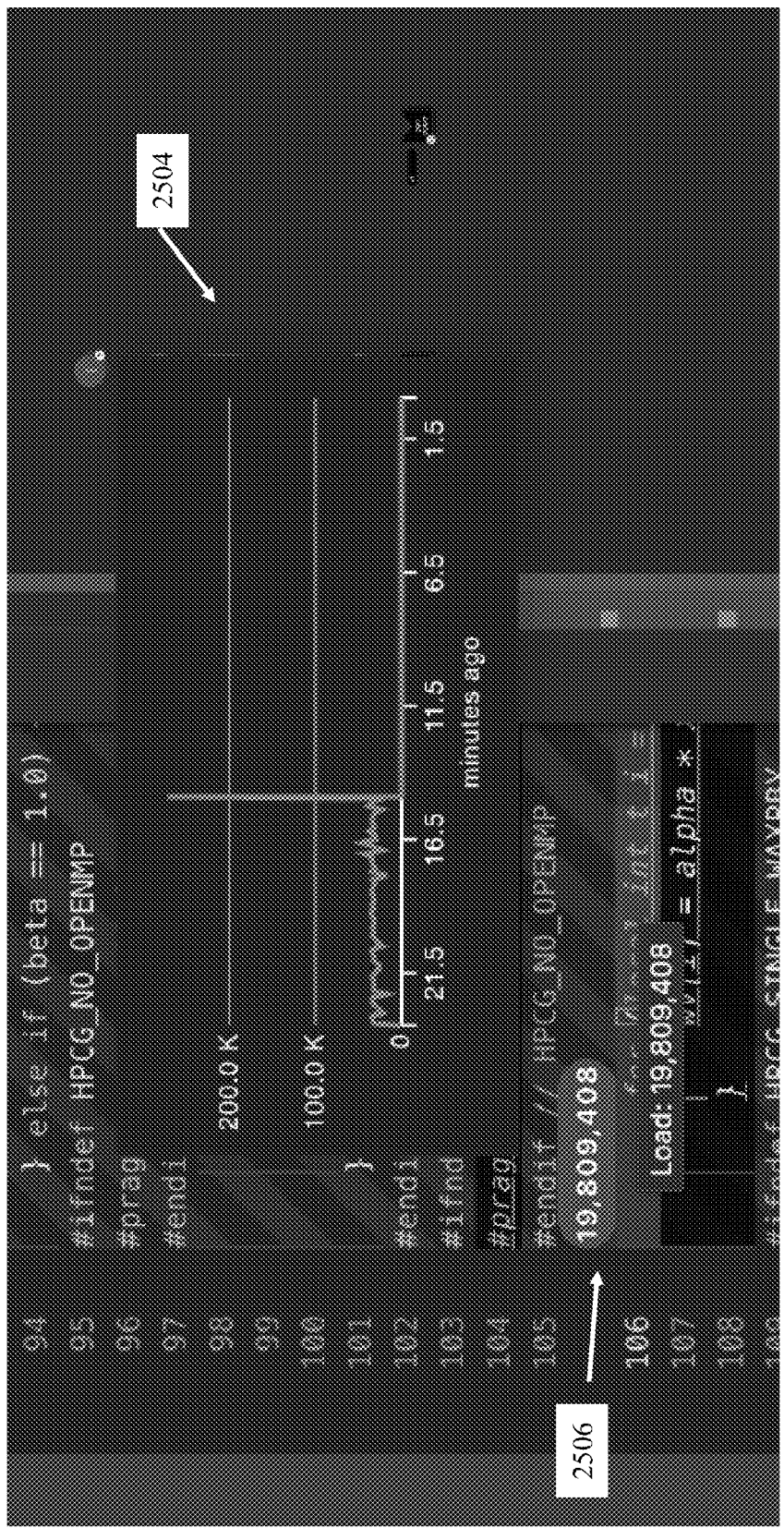
FIG. 25 is a schematic presenting real-time control flow branch counters displayed on top of the source code display of the GUI of FIG. 5, in accordance with some embodiments of the present invention.

Reference is now made to FIG. 1, which is a flowchart of an exemplary method of operating a GUI simultaneously presenting source code and an interactive graph, in accordance with some embodiments of the present invention. Reference is also made to FIG. 2, which is a flowchart of an exemplary method for operating a GUI that simultaneously presents source code mapped to an interactive graph representation for execution by a processor, in accordance with some embodiments of the present invention. Reference is also made to FIG. 3, which is a schematic of an exemplary front end-back end architecture for implementing the GUI, in accordance with some embodiments of the present invention. Reference is also made to FIG. 4, which is a schematic of an exemplary node 402 of the interactive graph presented in the GUI, in accordance with some embodiments of the present invention. Reference is also made to FIG. 5, which is a schematic of an exemplary GUI 502 that simultaneously presents source code and an interactive graph, in accordance with some embodiments of the present invention. Reference is also made to FIG. 6, which is a schematic of a list of files presented in response to a user click in the GUI, in accordance with some embodiments of the present invention. Reference is also made to FIG. 7, which is a schematic of the GUI 502 of FIG. 5, presenting an example for the compute blocks references table 702 that is presented in response to a selection of a portion of the code that is highlighted, in accordance with some embodiments of the present invention. Reference is also made to FIG. 8, which is a schematic depicting a response to a user selection of a node of the interactive graph, in accordance with some embodiments of the present invention. Reference is also made to FIG. 9, which is a schematic of a GUI 902 depicting correspondence between a certain line of code 906 and corresponding nodes 908A-E, in accordance with some embodiments of the present invention. Reference is also made to FIG. 10, which is a schematic of a GUI 1002 depicting a set of connected nodes 1004 1006 and 1008 each representing an independent graph and connections between the graphs, in accordance with some embodiments of the present invention. Reference is also made to FIG. 11, which is a schematic of a GUI 1102 of a logical view of the interactive graph, in accordance with some embodiments of the present invention. Reference is also made to FIG. 12, which is a schematic of a GUI 1202 of a compute view of the interactive graph, in accordance with some embodiments of the present invention. Reference is also made to FIG. 13, which is a schematic of a GUI 1302 of a hardware view of the interactive graph, in accordance with some embodiments of the present invention. Reference is also made to FIG. 14, which is a schematic of a GUI 1402 of a projection view of the interactive graph, in accordance with some embodiments of the present invention. Reference is also made to FIG. 15, which is a schematic of a GUI 1502 depicting a projection view 1504 of the interactive graph and another higher level view of abstraction 1506 (e.g., logic, compute, hardware) of the interactive graph, in accordance with some embodiments of the present invention. Reference is also made to FIG. 16, which is a GUI 1602 showing connectivity between different dataflow graphs, in accordance with some embodiments of the present invention. Reference is also made to FIG. 17, which is a GUI 1702 presenting visual indications of utilization of hardware resources of a processor executing a graph corresponding to source code, in accordance with some embodiments of the present invention. Reference is also made to FIG. 18, which is a GUI 1802 presenting a selection of a certain cluster 1804 and a corresponding window 1806 indicating which functions are being executed by the cluster and/or utilization of the hardware units of the cluster, in accordance with some embodiments of the present invention. Reference is also made to FIG. 19, which is a GUI 1902 presenting a selection of a certain cluster 1904 and corresponding nodes of an interactive graph 1906, in accordance with some embodiments of the present invention. Reference is also made to FIG. 20, which is a GUI 2002 presenting an option for viewing a memory-centric display of the processor, in accordance with some embodiments of the present invention. Reference is also made to FIG. 21, which is a GUI 2102 presenting memory elements of the processor, in accordance with some embodiments of the present invention. Reference is also made to FIG. 22, which is a schematic of a GUI 2202 presenting a full detail zoom of nodes of the interactive graph, in accordance with some embodiments of the present invention. Reference is also made to FIG. 23, which is a schematic of a GUI 2302 presenting a partial detail zoom of nodes of the interactive graph, in accordance with some embodiments of the present invention. Reference is also made to FIG. 24, which is a schematic of a GUI 2402 presenting a structure level zoom of nodes of the interactive graph, in accordance with some embodiments of the present invention. Reference is also made to FIG. 25, which is a schematic presenting real-time control flow branch counters 2506 displayed on top of source code display 504 of GUI 502 of FIG. 5, in accordance with some embodiments of the present invention.

System 100 may execute the acts of the method described with reference to FIG. 2-25, for example, by a hardware processor(s) 102 of a computing device 104 executing code 106A stored in a memory 106.

Computing device 104 computes one or more interactive graphs 122B for a source code 122A. Examples of interactive graphs 122B include: logical, compute, hardware, and/or projection, as described herein. Interactive graph 122B corresponds to source code 122A, as described herein. A code graph based on interactive graph 122B may be executed by a processor(s) 150 which may be implemented as a dataflow processor(s) and/or as a non-dataflow processor(s). Debug data 122C may be obtained from processor(s) 150 executing a representation of interactive graph 122B, which may be used for mapping user selection portion(s) of source code to node(s) and/or edge(s) of interactive graph 122B, and vice versa, as described herein.

Computing device 104 may be implemented as, for example, a client terminal, a virtual machine, a server, a virtual server, a computing cloud, a group of connected devices, a mobile device, a desktop computer, a thin client, a kiosk, and a mobile device (e.g., a Smartphone, a Tablet computer, a laptop computer, a wearable computer, glasses computer, and a watch computer).

Multiple architectures of system 100 based on computing device 104 may be implemented. For example:

A centralized (i.e., client-server) architecture. Computing device 104 executing stored code instructions 106A, may be implemented as one or more servers (e.g., network server, web server, a computing cloud, a virtual server) that provides services (e.g., one or more of the acts described with reference to FIGS. 2-25 to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser 108A running on client terminal(s) 108, and/or providing functions using a remote access session to the client terminals 108, such as through web browser 108A executed by client terminal 108 accessing a web sited hosted by computing device 104. For example, client terminals 108 access code 106A running on computing device 104 via web browsers 108A running on the client terminals 108, client terminals 108 download code 1006A for local execution (e.g., an app running on a smartphone), a plug-in that runs and/or accesses code 106A is installed on web browser 106A running on the client terminals 108, and/or client terminals 108 use an API to access code 106A running on computing device 104.

A localized architecture. Computing device 104 may be implemented as a standalone device (e.g., kiosk, client terminal, smartphone, server) that includes locally stored code instructions 106A that implement one or more of the acts described with reference to FIGS. 2-25. The locally stored instructions may be obtained from another server (e.g., 118), for example, by downloading the code over the network, and/or loading the code from a portable storage device. In such implementation, each user uses their own computing device 104 to interact with their own codegraph 122B.

Processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to as a program store, and/or data storage device) stores code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more acts and/or features of the method described with reference to FIGS. 2-25.

Computing device 104 may include a data storage device 122 for storing data, for example, one or more of: source code 122A, code graph 122B, and/or debug data 122C. Data storage device 122 may be implemented as, for example, a memory, a local hard-drive, a removable storage device, an optical disk, a storage device, and/or as a remote server and/or computing cloud (e.g., accessed over network 110). It is noted that code 122A-C may be stored in data storage device 122, with executing portions loaded into memory 106 for execution by processor(s) 102.

Processor 102 of computing device 104 may communicate with processor 150 via a processor interface 120, for example, a wire connection (e.g., physical port), a wireless connection (e.g., antenna), a local bus (e.g., PCIe), a port for connection of a data storage device, a network interface card, other physical interface implementations, and/or virtual interfaces (e.g., software interface, virtual private network (VPN) connection, application programming interface (API), and software development kit (SDK)).

Computing device 104 may include data interface 124, optionally a network interface, for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Client terminal(s) 108 may access computing device 104 via network, for example, for running code 106A.

Computing device 104 and/or client terminal(s) 108 includes or is in communication with a physical user interface 126 that includes a mechanism designed for a user to interact with a presentation presented on a display. For example, enabling a user to select a portion of source code for which nodes of the code graph are presented, and/or for selecting node(s) of the code graph for which corresponding source code is presented, as described herein. Exemplary physical user interfaces 126 include, for example, one or more of, a touchscreen, a display, a keyboard, a mouse, and voice activated software using speakers and microphone.

Referring now back to FIG. 2, the flowchart of the exemplary method for operating the GUI that simultaneously presents source code mapped to an interactive graph representation for execution by a processor(s), which may be implemented as a dataflow processor(s) and/or a non-dataflow processor(s) is presented.

At 202, an set-up procedure may be executed, for enabling matching between nodes and/or edges of the interactive and portions of the code, selected via the GUI, as described herein.

Optionally, the set-up procedure may be implemented as follows: compiler generated debug data corresponding to nodes and/or edges of the interactive graph is obtained. The nodes and/or edges of the interactive graph are traversed. The debug data is mapped to lines of the source codes according to the traversing process.

Referring now back to FIG. 3, the schematic of the exemplary front end-back end architecture for implementing the GUI, is described. The architecture may be used by the GUI for identifying nodes and/or edges of the interactive graph that correspond to selected portions of source code, for identifying portions of source code corresponding to selected portions of nodes and/or edges of the interactive graph, and/or for obtaining other data for presentation, as described herein.

A user 302 interacts with a front end display 304 which presents the GUI described herein. GUI interacts with a backend 306 and with a runtime 308 that manages the processor.

Backend 306 may include a matching engine that matches up the graph nodes and/or edges to specific parts of source code that represent them. The matching engine may use the data structure of the graph representation of the source code and compiler-generated debug data attached to the specific graph nodes. The data may be traversed, and the debug data may be associated to specific lines of code.

The following are exemplary features that may be executed by the backend for providing the frontend with features of the GUI described herein:

List of source files associated with running program. The frontend may query the backend for a list of source code files associated with the running program. The backend returns data, optionally in the following exemplary format: File ID: File name and file path.

Get source code of a specific file. The frontend may query for data attached to a specific source code file, for example, noted as File ID. The backend may return data in the following exemplary format: File IDX, File name and file path, and File content.

List of source lines with attached debug information. The frontend may query for data attached to a specific source code file, for example, noted as File ID. The backend may return data in the following exemplary format: File IDX; For each line with attached debug data: Line number, and List of range segments marking offsets in the line with debug data marked as Offset Start and Offset end.

List of all graphs referencing a specific block of source code. Frontend may query for a list of interactive (e.g., compute) graphs that reference a specific area of source code. The source code may be a specific file (e.g., parameter name:file ID) and/or a specific line (e.g., parameter name: Line number) and/or a specific offset in the number of characters from the start of the line (e.g., Parameter name:offset). The backend may return data in the following exemplary format: Compute graph ID, Function ID, Compute graph display name.

Specific interactive graph node query. Frontend may query for the source code associated with a specific interactive graph node. Given a specific interactive graph node, the attached DWARF (debugging with attributed record formats) debug data (e.g., all) may be extracted. For each attached debug data, the debug data may be parsed to reach the specific part offset, from there to a specific source file and offset in the source file, and the source file and offset may be appended to a list of returned results. The list of results may be returned.

Hardware unit to interactive graph query. Frontend may query what part of the program is mapped to different dataflow execution units (described as clusters). The frontend may request information about a specific hardware unit such as a logical element, and/or higher grouping of nodes such as a cluster and/or tile. Given a specific location the backend answers what are all the functions mapped to that execution unit listing, for example, Function ID, Function name, File name, Line number.

List of all dataflow graphs. Frontend queries what interactive (e.g., dataflow) graphs exist and the connectivity between them. The backend replies with a list of: Graph IDs, and Edges between each graph ID in format of (source, destination).

Referring now back to FIG. 2, at 204, a source code (e.g., of a program) is presented in the GUI. A portion of the source code may be presented, for example, the user may scroll through the source code for dynamically presenting different portions within a window of the GUI.

Referring now back to FIG. 2, at 206, an interactive graph is simultaneously presented in the GUI with the source code. For example, one window on one side of the display presents the source code, and another window on the opposite side of the display presents the interactive graph.

The interactive graph includes multiple nodes connected by edges representing the source code mapped to physical configurable elements of the processor. The physical configurable elements may be organized into computational clusters. Each physical configurable element is configurable to execute operations, for example, mathematical operations, memory operations, control flow operations, logic operations, bitwise operations, Boolean operations, and the like. Exemplary configurable operations (e.g., 32-bit) include: Adder: fixed-point addition, subtraction, addition with carry, subtraction with borrow, negate, increment, or decrement; Bitwise: AND, OR, NOT, NEG, XOR, sign extend, or zero extend; Shifter: shift-left, shift-right, or arithmetic shift-right; and Multiplier: 32-bit integer multiplier.

The configurable elements are not processor cores, and do not contain an instruction pipeline and/or instruction set. Rather, the configurable elements are re-configurable to perform one or more operations for a dataflow. The configurable elements may be, for example, logical element units (LEUs) optionally arranged into grid compute units (GCU). In an example architecture, each LEU is made up of a configuration element, a 32-bit arithmetic unit, a data select unit (MUX), and a flow control unit (flip-flop). Data may flows north-to-south. The data select unit receives the output of each of the 12 LEUs located to the north of the current LEU, and selects which one(s) to use as an input. An LEU can be received by multiple LEUs located to the south of it. Loops can be implemented via GSUs or a data-gated connectivity within a cluster or every two clusters. The dataflow architecture has no instruction stream in the sense that the instructions are not fetched from memory—they are configured to the grid ahead of time, and data flows through them. Each LEU may receive its configuration from the host CPU, which may wire the data select unit to retrieve data from a particular neighboring unit, and tells the arithmetic unit which operation to execute. The LEU's configuration does not necessarily change frequently, for example, it changes when optimization is needed.

Each node represents one or more operation mapped to physical configurable elements. Edges between nodes represent dataflow between the operations, mapped to physical dataflow links between the physical configurable elements.

Optionally, individual nodes (e.g., each node) of the interactive graph is associated with at least one of: a type of the node, connectivity to other nodes, and special traits of the node. The type, connectivity, and/or special traits may be visually depicted in the GUI, for example, using indications as show and described with reference to FIG. 4.

Referring now back to FIG. 4, node 402 describes a single computational element with one or the following exemplary visual traits: the operation 404, whether the compute node has debug data 406, and additional attributes on the compute nodes 408. For example, node 402 is an 'addition' operator node 404, with debug data 406, that outputs compute flag operations 408. Each row in the display contains the specific nodes and the nodes are connected according to their dataflow configuration.

Referring now back to FIG. 2, at 208, a user selection of a portion of the source code is received via the GUI. Examples of the portion that the user may select via the GUI include: a function, an execution block, and a line of code. The user may perform the selection, for example, by clicking with the mouse on the code, highlighting the code, drawing a border around the code, and the like.

Referring now back to FIG. 5, GUI 502 may include a source code display window 504 (on the left side of GUI 502) that is split into two parts 506 and 508. Top window 506 presents a list of available files. Bottom window 508 displays the source code. A graph window 510 (on the right side of GUI 502) presents the interactive graph (e.g., a compute graph is shown) which includes a group of graph nodes that indicate specific data flow operations along with the relationship between them, as described herein. Graph window 510 may include a main display showing a specific dataflow compute graph 516, which may be the specific data flow configuration of the compute graph as executed in an ideal processor.

Referring now back to FIG. 6, in response to the user clicking on the list of files in window 506 of GUI 502 of FIG. 5, a dropdown of results is displayed 602. This may be triggered by the query list of source files associated with the running program.

Clicking a specific file may load the file using the query "Get source code of a specific file" and specific lines are highlighted in the GUI according to the results of the query "List of source lines with attached debug information", where the queries are sent to the matching engine described herein.

The source code lines with debug data may be highlighted in a visually distinctive manner in the GUI, as described herein. In GUI 502 of FIG. 5, a black background 512 while source code lines with no debug data have a different background 514.

Clicking on a specific part of code that is highlighted may have one or two possible interaction modes, for example: Right-clicking (or other selection via the GUI) popups a context menu, allowing copying, command help and/or displaying the list of all compute blocks that reference the source code.

Referring now back to FIG. 7, compute blocks references table 702 (within GUI 502 of FIG. 5) that is presented in response to a selection of a portion of the code that is highlighted.

Left-clicking (or other selection mechanism via the GUI 502) a specific part of the source code and/or clicking a specific item in the bottom popup 702 leads to identical results where the right side pane (the compute graph display 510) loads the appropriate compute graph and highlights specific nodes. How specific nodes are highlighted is described herein.

Referring now back to FIG. 2, at 210, node(s) and/or edge(s) of the interactive graph that correspond to the portion of the source code are identified.

The node(s) and/or edge(s) may be identified by executing a query of the user selected portion of the source code on the outcome of the mapping, described with reference to 202.

Referring now back to FIG. 2, at 212, the GUI is updated for visually distinguishing the node(s) and/or edge(s) of the interactive graph that correspond to the use selected portion of the source code. Examples of visually distinguishing the node(s) and/or edge(s) that correspond to the user selected portion of the source code from other node(s) and/or edge(s) that do not correspond to the user selected portion of the source code include: different colors, different shapes, different patterns (e.g., background within the nodes, different patterns of lines representing edges), and the like.

The visually distinguished node(s) represent a mapping to certain physical configurable elements of the processor configured to execute the user selected portion of the source code. The visually distinguished edge(s) represent certain dataflow links between the certain physical configurable elements of the processor configured to execute the user selected portion of the source code.

The GUI visually distinguishes the node(s) and/or edges of the interactive graph corresponding to the user selected portion of the source code with a marking that is different from other nodes and/or edges of the interactive graph. Alternatively or additionally, nodes of the interactive graph that map to the source code include a visual marker presented within the GUI. Other nodes of the interactive graph that do not map to the source code exclude the visual marker. Examples of markings include: color coding, patterns of the background, shapes of the nodes, patterns of the edges, bold, and the like.

Optionally, the interactive graph within the GUI is updated for depicting edges between the visually distinguished node(s) (that correspond to the selected portion of the source code), and/or excluding links between other nodes (that do not correspond to the selected portion of the source code). Removing the edges may simplify the presentation of the interactive graph for a user, enabling the user to visually inspect the portion of the interactive graph that corresponds to the selection portion of the source code, with reduced or eliminated clutter from the other parts of the interactive graph that do not correspond to the selection portion of the source code.

Alternatively or additionally, the interactive graph of the GUI is automatically updated, for example, based on optimizations of the configurations of the physical configurable elements, such as by the management software that manages the processor. In an example, when source code of an application runs, management software identifies the source code application's likely flow, translates the intermediate representation into compute graphs (which may be viewed in the GUI as the interactive graph described herein), and then projects and configures the compute graphs of the likely flows onto the chip's grid of configurable elements. The application's threads and processes are migrated as data streams that flow through the grid; the data streams are repetitive and include the control flow. The management software projects a layout of the compute graph onto the hardware grid of configurable elements. Every few seconds, the management software on the host CPU receives data (e.g., telemetry) from thousands of hardware counters and/or data points on the chip (which may be viewed in the GUI, as described herein). The management software may analyzes and learn from the application flows and detects bottlenecks. The management software may conduct an intensive analysis to understand where best to optimize flows, and then reconfigures part of the silicon to reflect that optimization (i.e., takes the suggested layout and reconfigures the hardware). The interactive graph(s) presented in the GUI may be dynamically updated to present the reconfigurations. It is noted that the dynamic update of the interactive graph(s) presented in the GUI may occur, for example, at any time, and/or with respect to other updates of the GUI, for example, 220 of FIG. 2, 206 of FIG. 2, during iterations of 234 of FIG. 2, and the like.

Referring now back to FIG. 2, at 214, the method may iterate back to 202, for example, to enable the user to select another portion of source code, and/or for the user to select nodes and/or edges of the interactive graph which trigger marking of the corresponding portion of the source code (e.g., as described with reference to the flow of 216-220, and/or to select other features, for example, as described with reference to 224-232.

Referring now back to FIG. 2, at 216, a user selection of one or more nodes and/or one or more edges of the connected nodes of the interactive graph is received via the GUI. The node(s) and/or edge(s) may be selected, for example, by the user clicking on the nodes and/or edges, drawing a boundary around the nodes and/or edges, and the like.

Referring now back to FIG. 8, GUI 802 is in response to selection of (e.g., the user's mouse hovers over, or other selection mechanisms may be implemented) a central node 804 (Unsigned multiply 32 bit) of the interactive graph. A line 806 above central node 804 denote the data input. The 3 lines "flowing data" 808 denote the output from computational element represented by node 804.

Real-time control flow branch counters may be displayed next to the compute block entry node. The same number displayed in the former "Source code display", and has the same graph on hover interaction, depicting load over time.

GUI 802 may present in depth information on each node, for example, one or more of: showing immediate inputs, whether the node is correlated to a specific line of source code and whether the node outputs flag data.

Optionally, selecting (e.g., left clicking) a specific node may trigger a query to the matching engine, for example, a "Specific codegraph node query" with the parameters of the specific compute graph the user is viewing (e.g., function ID and/or compute graph ID) optionally along with the node ID. An exemplary reply from the matching is as described herein.

Referring now back to FIG. 2, at 218, a portion of the source code corresponding to the selected node(s) and/or edge(s) is identified. The nodes and/or edges represent a mapping to certain physical configurable elements and certain dataflow links between the certain physical configurable elements of the processor configured to execute a portion of the identified source code.

The portion of the source code may be identified by executing a query of the user selected nodes and/or edges on the outcome of the mapping, described with reference to 202.

Referring now back to FIG. 2, at 220, the GUI is updated for visually distinguishing the portion of the source code corresponding to the user selected node(s) and/or edge(s) from other portions of the source code that do not correspond to the user selected node(s) and/or edge(s) include, for example, highlighting the portion, changing the color of the text of the portion of the source code, bolding the text of the portion, underlining the text of the portion, changing the font, changing the size of the text, changing the style of the font (e.g., italic), and using badges.

Referring now back to FIG. 9, GUI 902 may correspond to GUI 502 described with reference to FIG. 5. In a source code display window 904 (e.g., as described with reference to 504 of FIG. 5), a line of code 906 is visually distinguished, for example, by changing the color of the text and/or highlighting the text and/or other approaches described herein. In a graph window 910 (e.g., as described with reference to 510 of FIG. 5) nodes 908A-E that correspond to (e.g., share debug data with) line of code 906 are visually distinguished, for example, by changing the color and/or pattern of the node. As described herein, the user may first select the portion of the code, which triggers the visual distinguishing nodes and/or edges of the interactive graph that correspond to the selected portion of code. Alternatively, the user may first select the nodes and/or edges of the interactive graph, which triggers the visual distinguishing of portions of the code that correspond to the selected nodes and/or edges of the interactive graph.

Referring now back to FIG. 2, at 222, the method may iterate back to 202, for example, to enable the user to select another node(s) and/or edge(s), and/or for the user to select a portion of source code which trigger marking of the corresponding nodes and/or edges of the interactive graph (e.g., as described with reference to the flow of 208-212, and/or to select other features, for example, as described with reference to 224-232.

Referring now back to FIG. 2, at 224, a selection of another representation of the interactive graph, which is different than the current representation of the interactive graph, is received via the GUI. For example, the user clicks on one of multiple icons each indicating a different representation of the interactive graph.

There may be multiple available representations of the interactive graph to select from. The multiple representation of the interactive graph may be of decreasing abstraction and increasing hardware representation of the processor. Relatively higher abstract representations of the interactive graph and/or relatively lower hardware representations of the interactive graph may depict the logical flow of operations based on the source code. Relatively lower abstract representations of the interactive graph and/or relatively higher hardware representations of the processor may depict interactions between physical configuration elements of the processor, i.e. closer to the actual hardware implementation by the processor.

Exemplary representations of the interactive graph include a logical representation closest to the source code (e.g., abstract syntax tree (AST), abstract syntax graph (ASG), or partially lowered version of ASG), a compute representation representing an intermediate representation indicating optimization of the logical representation towards the hardware representation, and a hardware representation indicating mapping of source code to regions of the processor (e.g., the physical configurable elements) executing the source code.

In response to the user selection of a new representation, a mapping between nodes and/or edges of the currently presented representation of the interactive graph presented in the GUI and nodes and/or edges of the new user selected representation of the interactive graph, is determined. The GUI is updated from the currently presented representation of the interactive graph to the new user selected representation of the interactive graph according to the mapping. Node(s) and/or edge(s) of the new user selected representation of the interactive graph, which correspond to the visually distinguished node(s) and/or edge(s) of the currently (or previously) presented representation of the interactive graph are identified according to the mapping, and visually distinguished. The GUI now presents visually distinguished nodes and/or edges of the new representation of the interactive graph that correspond to the visually distinguished nodes and/or edges of the previously presented representation of the interactive graph.

Optionally, the selected representation of the interactive graph is a projection graph. The projection graph includes nodes connected by edges representing the source code in a representation for execution by the processor. Optionally, the projection graph is overlaid over the schematic of the processor in the GIU. The GUI may present the projection graph as an overlay over configurable elements of the processor, for example, over a hardware representation of the processor that depicts configurable elements that are configured for executing the source code and/or the operations and/or dataflows represented by the nodes and/or edges representing the source code. Nodes of the projection graph corresponding to different portions of the source code may be overlaid over corresponding computational clusters of physical configurable elements of the processor executing respective portions of the source code. In other words, a certain node(s) is overlaid over the physical configurable element(s) configured to perform the operation represented by the certain node(s). The flow follows other features described with reference to FIG. 2, where the projection graph is used as the representation of the interactive graph. For example, at 208, a user selection of a portion of the source code is received via the GUI. At 210, node(s) and/or edge(s) of the projection graph corresponding to the used selected portion of the source code are identified. At 212, the GUI is updated for visually distinguishing the node(s) and/or edge(s) of projection graph corresponding to the used selected portion of the source code. Alternatively or additionally, at 216, a user selection of node(s) and/or edge(s) of the projection graph is received via the GUI. At 218, a portion of the source code corresponding to the user selected node(s) and/or edge(s) of the projection graph is identified. At 220, the GUI is updated for visually distinguishing the portion of the source code corresponding the user selected node(s) and/or edge(s).

Optionally, the selected representation of the interactive graph is a control flow display graph. Each node of the control flow display interactive graph represents a sub-graph, which may be a complete graph for a certain source code. Connections between the sub-graphs (shown as nodes) represent dataflow between the sub-graphs. For example, the connections represent dataflow between different programs. The flow follows other features described with reference to FIG. 2, where the control flow display graph is used as the representation of the interactive graph. For example, at 216, a user selection of node(s) and/or edge(s) of the control flow display graph is received via the GUI. At 218, A portion of the source code corresponding to the user selected node(s) and/or edge(s) of the control flow display graph is identified, where each node represents a complete sub-graph. At 220, The GUI is updated for visually distinguishing the portion of the source code corresponding to the user selected sub-graph (s) (i.e., node(s) and/or edge(s) of the control flow display graph.

Referring now back to FIG. 10, GUI 1002 depicts a set of connected nodes 1004 1006 and 1008, each representing an independent and/or whole interactive (e.g., dataflow, compute) graph, with edges describing connections between the dataflow graphs. Each node may be viewed and/or interacted with as an interactive graph via the GUI, a compute graph and/or other representations, as described herein. GUI 1002 may help the user to understand the relationship between nodes 1004 1006 and 1008 as a set of edges connecting the dataflow graphs and connecting the dataflow graphs to the source code.

Graph 1004 receives inputs from "outside" 1010 and from graph 1008 and outputs data to unlikely flow 1012 and to compute graph 1006. Compute graph 1006 flows back to itself 1014 or to graph 1008, while graph 1008 always looks 1016 back to graph 1004.

Optionally, for one or more (e.g., each) graph 1004 1006 and 1008 in GUI 1002, real-time counter values may displayed, for example, within the node. In response to a selection via GUI 1002 of (e.g., hovering over a certain node representing a) certain compute graph may trigger an animated direction of load flow, which may assist the user in understanding ingress and egress data flow for the hovered compute graph.

Optionally, in response to selecting a node representing a graph, the node is connected to the corresponding source code, and the portions of the source code corresponding to the selected graph are visually distinguished, for example, the relevant lines of code are presented and/or highlighted in red (or another color).

As is common in many computing architectures, the amount of details required to show actual execution is far too much to allow most users to extract useful conclusions. The GUI described herein is designed for the user to control the level of abstraction provided, for example, to enable reaching useful conclusions. GUIs presented within FIGS. 11, 12, 13, and 14 present exemplary varying levels of abstraction, as described herein.

Referring now back to FIG. 11, GUI 1102 depicts a logical view of the interactive graph. The logical view may display the dataflow graph abstracted away from architectural details. At this level the user can follow the high level code close to how the user wrote it, containing concepts such as function calls and higher level code abstractions such as floating point operations. For example, the F.MUL node 1104 is a synthetic node that only exists in a high level representation.

Referring now back to FIG. 12, GUI 1202 depicts the computer view of the interactive graph. The compute view may display a hardware generation agnostic display. For example, memory access nodes 1204A-B exist in GUI 1202 despite not existing in hardware. At this level the user sees how the dataflow program would be executed in an ideal hardware.

Referring now back to FIG. 13, GUI 1302 depicts the hardware view of the interactive graph. The hardware view may displays the idealized execution of code on a specific design of a processor. At this level generation specific details show up, such as translating commutative binary operations into individual binary commands. For example, writer nodes 1304 and feeder nodes 1306, which are part of the hardware logical execution units but have no meaning in the source code, are displayed.

Referring now back to FIG. 14, GUI 1402 depicts the projection view of the interactive graph. This view displays the source code as it runs on an actual executing processor with all the connectivity connecting the different logical execution units (LEUs). Projection view displays the actual routing and connectivity in a dataflow architecture as implemented in a specific processor.

Referring now back to FIG. 2, at 226, one or more additional representations of the interactive graph are presented simultaneously with the currently presented interactive graph. The corresponding nodes and/or edges of the multiple representations of the interactive graph, which may correspond to the portion of the source code, are visually indicated, as described herein.

Optionally, the projection graph (i.e., of the source code and/or of the interactive graph) is simultaneously presented in the GUI with another representation of the interactive graph (e.g., logical, compute, hardware). The representation of the interactive graph may be selected by the user, as described herein. The source code may be simultaneously presented in the GUI with the projection graph and the selected representation of the interactive graph.

Optionally, operation of the GUI that simultaneously presents the projection graph and the interactive graph may proceed similarly to other features described with reference to FIG. 2. For example, a user selection of node(s) and/or edge(s) of the interactive graph is received via the GUI. Node(s) and/or edge(s) of the projection graph corresponding to the user selected node(s) and/or edge(s) of the interactive graph are identified. The GUI is updated for visually distinguishing the node(s) and/or edge(s) of the projection graph overlaid on the hardware representation of the processor, corresponding to the user selected node(s) and/or edge(s) of the interactive graph. Alternatively, a user selection of node(s) and/or edge(s) of the projection graph is received via the GUI. Node(s) and/or edge(s) of the interactive graph corresponding to the user selected node(s) and/or edge(s) of the projection graph are identified. The GUI is updated for visually distinguishing the node(s) and/or edge(s) of the interactive graph.

Referring now back to FIG. 15, GUI 1502 depicts projection view 1504 of the interactive graph and another higher level view of abstraction 1506 (e.g., logic, compute, hardware) of the interactive graph. Example connections between the projection level and hardware level are presented. In this view, in response to selecting (e.g., left clicking) a specific memory entry point (MEP) node or block, the respective accessed memory regions are highlighted in the memory address space view. In this view, when selecting (e.g., shift+left clicking) a specific memory entry point (MEP) node or block, the respective accessed Bins are highlighted in the memory hardware resources view. In this view, when selecting (e.g., ctrl+left clicking) a specific memory entry point (MEP) node or block, the respective memory allocation request is visually marked (e.g., highlighted) in the source code view (e.g. "malloc").

Referring now back to FIG. 16, GUI 1602 presents connectivity between different dataflow graphs. For example, once the user understands a particular compute graph, its pieces and behavior on the physical hardware, the user may use GUI 1602 to see the connection between the different dataflow graphs. GUI 1602 may be a distinct display that shows connectivity.

Referring now back to FIG. 2, at 228, the GUI may be operated in a chip viewer mode and/or memory address space view mode. The chip viewer mode and/or memory address space view mode may be entirely presented within the GUI, and/or may be simultaneously presented with other interactive graphs and/or the projection graph and/or the source code, as described herein.

Optionally, the chip viewer mode includes a presentation of a schematic of the processor including multiple computational clusters, where each cluster includes multiple physical configurable elements. In another implementation, the schematic of the processor depicts multiple physical configurable elements (e.g., in a zoom in view). Computational cluster and/or physical configurable elements executing the source code may be visually indicated, for example, color coded, marked with a pattern, a bold around boxes representing each cluster and/or element, and the like.

Referring now back to FIG. 17, GUI 1702 presents visual indications of utilization of hardware resources of the processor executing a graph corresponding to source code. GUI 1702 presents an additional level of looking at the physical configuration elements of the processor that are being used, where the mapping is not between lines of code and nodes but rather between functions and coarse grained execution units. The user may navigate to more detailed levels of view. GUI 1702 may present, for example, a whole tile of hardware resources 1704, visually indicating (e.g., by coloring) which portions are being utilized 1706 and/or visually indicating (e.g., by lack of coloring) which portions are not being utilized 1708.

Referring now back to FIG. 18, GUI 1802 presents window 1806 indicating which functions are being executed by a cluster and/or utilization of the hardware units of the cluster, in response to selection of the cluster 1804, for example, by hovering over the cluster with a pointer and/or clicking on the cluster. It is noted that "7:22" presented in window 1806 refers to the function and graph ID.

Referring now back to FIG. 19, GUI 1902 presents a visual marking of source-code of functions 1906 mapped to selected cluster 1904, generated in response to selection of cluster 1904. Cluster 1902 is mapped to specific logical elements as part of a specific interactive graph 1906 and to the source code. Users may select (e.g., click) a certain cluster 1904 and in response, a source-code highlight of the functions mapped to that cluster are presented.

Optionally, operation of the GUI that simultaneously presents the schematic of the processor and the source code and/or interactive graph may proceed similarly to other features described with reference to FIG. 2. For example, a user selection of computational cluster(s) and/or physical configurable elements executing the source code is received via the GUI. The portion of the source code corresponding to the user selected computational cluster(s) and/or physical configurable elements is identified. The GUI is updated for visually distinguishing the portion of the source code being executed by the user selected computational cluster(s) and/ or physical configurable element(s). In another example, a user selection of a portion of the source code is received via the GUI. The computational cluster(s) and/or physical configurable elements corresponding to the portion of the source code is identified. The GUI is updated for visually distinguishing the computational cluster(s) and/or physical configurable element(s) executing the user selection portion of the source code.

In the implementation(s) in which the GUI simultaneously presents the schematic of the processor with the representation of the interactive graph, operation of the GUI may proceed similarly to other features described with reference to FIG. 2. For example, a user selection of computational cluster(s) and/or physical configurable elements executing the source code is received via the GUI. The node(s) and/or edge(s) of the interactive graph corresponding to the user selected computational cluster(s) and/or physical configurable elements are identified. The GUI is updated for visually distinguishing the node(s) and/or edge (s) of the interactive graph corresponding to the user selected computational cluster The portion of the source code corresponding to the computational cluster(s) and/or physical configurable element(s) is identified. and optionally to the portion of the source code corresponding to the user selected computational cluster(s) and/or physical configurable element(s).

Optionally, in memory address space view mode a user selection of one or more memory regions of the processor is received via the GUI. The GUI is update for visually distinguishing a memory allocation request of the source code and/or a call stack up to an allocation routine at a time of allocation, corresponding to the at least one memory region selected by the user.

Alternatively or additionally, memory hardware resources are displayed within the GUI. A user selection of one or more bins denoting a memory cache element of the processor is received via the GUI. The GUI is updated for visually representing an element in one or more memory regions of the processor corresponding to the bin(s).

Optionally, the GUI presents virtual and linear memory address spaces, and/or mappings between the virtual and linear memory address spaces. In response to clicking a specific memory region in the GUI, the respective memory allocation request is visually distinguished (e.g., highlighted) in the source code (e.g. "malloc") and/or in the call stack up to the allocation routine at time of allocation.

Referring now back to FIG. 20, GUI 2002 presents an option for viewing a memory-centric display of the processor. For example, by selecting (e.g., left clicking) a layers button 2004 on the left pane of the screen, and choosing "memory" 2006 in the menu.

Referring now back to FIG. 21, GUI 2102 presents memory elements of the processor, also referred to herein as a memory hardware resources display. The memory hardware resource display may include a main display window 2104 presenting memory elements 2106 in the silicon of the processor. For example, an abstract rectangle view that includes 4 high bandwidth memory (HBM) complexes surrounding a 8-tile cluster-complexes of layered data-flow components is presented. The aforementioned data-flow components represent the compute, memory and network overlays of the data-flow element.

The data-flow clusters may include 2 local memory cache elements, referred to herein as Bins. Each Bin has direct access to its own specific HBM slice. In response to selection of (e.g., hovering over with a cursor) a bin, a pop up may be presented that shows a snippet containing location information (row+column+bin ID inside a cluster), and/or a real time memory telemetry depicting information according to the selected memory context layer. There may be numerous layers. The GUI 2102 may enable a user to select the desirable memory context layer using a menu 2108 (e.g., shown in the top right corner of the screen). Using those layers, a real-time data of one or more of the following information may be presented: 1. Per-Bin hit/miss rate. 2. Per Memory Exit Point translation lookaside buffer information. 3. Memory network backpressure.

Using GUI 2102, in response to selecting (e.g., clicking) a specific Bin, the respective mapped memory region (represented by a linear memory address) is selected in the Address Space View.

Referring now back to FIG. 2, at 230, a user input for a zoom in on the interactive graph and/or projection graph may be received via the GUI.

Optionally, in the case of the zoom in on the projection graph, the GUI is updated for presenting nodes of the interactive graph projected on computational clusters of the processor. Each computational cluster includes physical configurable elements (e.g., of logical element units) that are configurable to perform operations. The different zoom levels may show different sized clusters of the physical configurable elements. For example, at a lowest level, individual physical configurable elements are shown, optionally with nodes of the projection graph representing individual operations overlaid on the individual physical configurable elements configured to perform the operation of the overlaid node. At a higher level, individual computational clusters of multiple physical configurable elements are shown, optionally with nodes of the projection graph representing operations overlaid on the individual clusters configured to perform the operation(s) of the overlaid node.

Referring now back to FIG. 22, GUI 2202 presents a full detail zoom of nodes of the interactive graph, which may present full details of the nodes, for example, each node presents its type, connectivity, and/or additional metadata (e.g., immediate input, output type, etc.). There may be multiple levels of zoom providing varying amounts of detail, which may help guide the user to actionable information for each zoom level.

Referring now back to FIG. 23, GUI 2302 presents a partial detail zoom of nodes of the interactive graph, where each node displays its type and connectivity to other nodes. Other details of the node may be omitted. The omission of the details may enable simultaneously presenting a larger number of nodes on the display in comparison to the full detail zoom of GUI 2202 shown in FIG. 22.

Referring now back to FIG. 24, GUI 2402 presents a level of zoom in which structure of the nodes of the interactive graph is depicted, without providing any additional details of the nodes and without showing connectivity. Each node may be represented as a blank box. Connectivity may be presented in response to a user selecting specific node(s). The omission of the details and/or connectivity may enable simultaneously presenting a larger number of nodes on the display in comparison to the full detail zoom of GUI 2202 shown in FIG. 22, and/or as shown in GUI 2302 of FIG. 23.

Referring now back to FIG. 2, at 232, real time and/or historical performance metrics may be presented in the GUI.

Optionally, a user selection of node(s) and/or edge(s) of the interactive graph is received via the GUI, for example, the user clicks, places the cursor to hover, and the like. The GUI may be updated for presenting real time performance metrics of the selected node(s) and/or edge(s) of the interactive graph during execution of the source code by the processor. The GUI may be updated for presenting historical data of the performance metrics of the selected node(s) and/or edge(s) of the interactive graph for historical execution of the source code by the processor. Optionally, the GUI is dynamically updated in real time for presenting updates of the real time performance metrics and/or the historical data of the performance metrics.

Referring now back to FIG. 25, GUI 502 of FIG. 5 is shown with real-time control flow branch counters 2506 displayed on top of source code display window 504 of FIG. 5. Data in window 504 may present the current control flow telemetry of the compute block, and may be updated in real time (or near real time). Hovering (or other selection mechanism) over, for example the counter 2506 itself, may pop up a rolling updated graph 2504, which may show a chart of the telemetry values over time.

Referring now back to FIG. 2, at 234, one or more features described with reference to 224-232 may be iterated, performed sequentially, and/or performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies Ra priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of operating a graphical user interface (GUI) presenting a representation of code for execution by a processor, comprising:
   presenting in the GUI, a source code;
   presenting in the GUI simultaneously with the source code, an interactive graph of a plurality of nodes connected by edges representing the source code mapped to physical configurable elements of at least one computational cluster of the processor each configurable to execute mathematical operations,
   wherein each node represents the at least one mathematical operation mapped to the physical configurable elements, and the edges between the nodes represent dependencies between the mathematical operations, mapped to physical dependency links between the configurable elements;
   obtaining compiler generated debug data corresponding to the plurality of nodes of the interactive graph;
   traversing the plurality of nodes of the interactive graph;
   mapping the debug data to lines of the source codes according to the traversing;
   receiving, via the GUI, a user selection of a portion of the source code;
   determining at least one of: at least one node and at least one edge of the interactive graph corresponding to the portion of the source code,
   wherein the determining is performed by executing a query of the user selected portion of the source code on an outcome of the mapping; and
   updating the GUI for visually distinguishing the at least one of: the at least one node and the at least one edge of the interactive graph,
   wherein the visually distinguished at least one node represents a mapping to certain physical configurable elements and the visually distinguished at least one edge represents certain dependency links between the certain physical configurable elements of the processor configured to execute the user selected portion of the source code.

2. The computer implemented method of claim 1, wherein the processor comprises a dataflow processor.

3. The computer implemented method of claim 1, wherein the processor comprises a non-dataflow processor, and the interactive graph is of a lower-level representation and/or intermediate representation of the source code mapped to physical configurable elements of the non-dataflow processor.

4. The computer implemented method of claim 1, further comprising:
   receiving, via the GUI, another user selection of at least one of: at least one node and at least one edge of the interactive graph;
   determining another portion of the source code corresponding to the selected at least one of: at least one node and at least one edge; and
   updating the GUI for visually distinguishing the portion of the source code.

5. The computer implemented method of claim 1, wherein visually distinguishing comprises marking the at least one of: at least one node and at least one edge of the interactive graph corresponding to the user selected portion of the source code with a marking that is different from other nodes and/or other edges of the interactive graph.

6. The computer implemented method of claim 1, wherein each node is associated with at least one of: a type of the node, connectivity to other nodes, and special traits of the node.

7. The computer implemented method of claim 1, wherein the user selection is selected from a group consisting of: a function, an execution block, and a line of code.

8. The computer implement method of claim 1, wherein nodes of the interactive graph that map to the source code include a visual marker, and other nodes of the interactive graph that do not map to the source code exclude the visual marker.

9. The computer implemented method of claim 1, further comprising:
in response to a toggling between different representations of the interactive graph of decreasing abstraction and increasing hardware representation of the processor received via the GUI, updating the GUI for visually distinguishing the at least one node and/or the at least one edge from a currently presented representation of the interactive graph to the toggled representation of the interactive graph according to a mapping of nodes and edges between the different representations of the interactive graph.

10. The computer implemented method of claim 1, further comprising:
receiving via the GUI, a user selection of one of a plurality of representation of the interactive graph of decreasing abstraction and increasing hardware representation of the processor;
determining a mapping between nodes and edges of a currently presented representation of the interactive graph presented in the GUI and nodes and edges of the user selected representation of the interactive graph;
updating the GUI from the currently presented representation of the interactive graph to the user selected representation of the interactive graph; and
visually distinguishing, according to the mapping, at least one of: at least one node and at least one edge of the user selected presentation of the interactive graph corresponding to the visually distinguished at least one of: at least one node and at least one edge of the currently presented representation of the interactive graph.

11. The computer implemented method of claim 10, wherein the plurality of representations of the interactive graph include a logical representation closest to the source code, compute representation representing an intermediate representation indicating optimization of the logical representation towards the hardware representation, and a hardware representation indicating mapping of source code to regions of the processor executing the source code.

12. The computer implemented method of claim 1, wherein updating comprises updating the presentation of the interactive graph within the GUI for depicting links between the visually distinguished at least one node, and excluding links between other nodes.

13. The computer implemented method of claim 1, further comprising:
computing a projection graph of the interactive graph representing the source code, the projection graph including nodes mapped to computational clusters of the processor executing respective portions of the source code by respective computational clusters; and
presenting within the GUI the projection graph overlaid on a hardware representation of the processor executing the source code.

14. The computer implemented method of claim 13, further comprising:
receiving via the GUI, a user input for a zoom in on the projection graph, and
updating the GUI for presenting nodes of the graph projected on computational clusters of the processor, wherein each computational cluster include a plurality of logical element units that are configurable to perform operations.

15. The computer implemented method of claim 13, further comprising:
presenting within the GUI, the interactive graph representing the source code;
receiving, via the GUI, a user selection of the that least one node of the interactive graph;
determining the at least one node of the projection graph corresponding to the user selected at least one node; and
updating the GUI for visually distinguishing the at least one node of the projection graph overlaid on the hardware representation of the processor.

16. The computer implemented method of claim 13, further comprising:
presenting within the GUI, the interactive graph representing the source code; receiving, via the GUI, a user selection of at least one node of the projection graph;
determining at least one node of the interactive graph corresponding to the user selected at least one node of the projection graph; and
updating the GUI for visually distinguishing the at least one node of the interactive graph corresponding to the user selected at least one node of the projection graph.

17. The computer implemented method of claim 1, further comprising:
receiving, via the GUI, a user selection of the at least one node of the interactive graph; and
updating the GUI for presenting at least one of: (i) real time performance metrics of the at least one node of the interactive graph during execution of the source code by the processor, and (ii) historical data of the performance metrics,
wherein the GUI is dynamically updated in real time for presenting updates of at least one of (i) the real time performance metrics, and (ii) the historical data of the performance metrics.

18. The computer implemented method of claim 1, wherein each node of the interactive graph represents a sub-graph, wherein edges between the sub-graphs represent dependencies between the sub-graphs.

19. The computer implemented method of claim 18, further comprising:
receiving, via the GUI, a user selection of at least one node of the connected nodes of the interactive graph representing at least one sub-graph;
determining a portion of the source code corresponding to the at least one sub-graph; and
updating the GUI for visually distinguishing the portion of the source code.

20. A computer implemented method of operating a graphical user interface (GUI) presenting a representation of code for execution by a processor, comprising:
presenting in the GUI, a source code;
presenting in the GUI simultaneously with the source code, an interactive graph of a plurality of nodes connected by edges representing the source code mapped to physical configurable elements of at least one computational cluster of the processor each configurable to execute mathematical operations, wherein each node represents the at least one mathematical operation mapped to the physical configurable elements, and the edges between the nodes represent dependencies between the mathematical operations, mapped to physical dependency links between the physical configurable elements;

obtaining compiler generated debug data corresponding to the plurality of nodes of the interactive graph;

traversing the plurality of nodes of the interactive graph;

mapping the debug data to lines of the source codes according to the traversing;

receiving, via the GUI, a user selection of at least one of: at least one node and at least one edge of the interactive graph representing a mapping to certain physical configurable elements and certain dependency links between the certain physical configurable elements of the processor configured to execute a portion of the source code;

determining the portion of the source code corresponding to the at least one of: at least one node and at least one edge, wherein the determining is performed by executing a query of the user selected at least one node and/or at least one edge, on an outcome of the mapping; and updating the GUI for visually distinguishing the portion of the source code.

21. A computer implemented method of operating a graphical user interface (GUI) presenting a schematic of a processor, comprising:

presenting in the GUI, the schematic of the processor including a plurality of computational clusters, with visual indication of at least one computational cluster of the plurality of computational clusters executing a source code;

presenting in the GUI simultaneously with the schematic of the processor, an interactive graph of a plurality of connected nodes representing the source code in a representation for execution by at least one computational cluster of the processor;

obtaining compiler generated debug data corresponding to the plurality of nodes of the interactive graph;

traversing the plurality of nodes of the interactive graph;

mapping the debug data to lines of the source codes according to the traversing;

receiving, via the GUI, a user selection of at least one computational cluster of the plurality of computational clusters executing the source code; and updating the GUI, for visually distinguishing a portion of the source code being executed by the at least one computational cluster selected by the user;

in response to the user selection, updating the GUI for visually distinguishing at least one node of the plurality of connected nodes of the interactive graph corresponding to the user selected at least one computational cluster and to the portion of the source code corresponding to the user selected at least one computational cluster, wherein the portion of the source code being executed by the at least one computational cluster for being visually distinguished is determined by executing a query of the user selected at least one computational cluster on an outcome of the mapping.

22. The computer implemented method of claim 21, further comprising:

receiving, via the GUI, another user selection of at least one memory region of the processor; and updating the GUI, for visually distinguishing a memory allocation request of the source code and/or a call stack up to an allocation routine at a time of allocation, corresponding to the at least one memory region selected by the user.

23. The computer implemented method of claim 21, further comprising:

receiving, via the GUI, another user selection of at least one bin denoting a memory cache element of the processor; and updating the GUI, for visually representing an element in at least one memory region of the processor corresponding to the at least one bin.

24. A computer implemented method of operating a graphical user interface (GUI) presenting a representation of code for execution by a processor, comprising:

presenting in the GUI, a source code;

presenting in the GUI simultaneously with the source code, a projection graph of a plurality of nodes connected by edges representing the source code in a representation for execution by the processor, the projection graph presented as an overlay, wherein nodes of the projection graph corresponding to different portions of the source code are overlaid over corresponding computational clusters of the processor executing respective portions of the source code;

obtaining compiler generated debug data corresponding to the plurality of nodes of the projection graph;

traversing the plurality of nodes of the projection graph;

mapping the debug data to lines of the source codes according to the traversing;

at least one of:

(i) receiving, via the GUI, a user selection of a portion of the source code;

determining at least one of: at least one node and at least one edge of the projection graph corresponding to the portion of the source code, wherein the determining is performed by executing a query of the user selected portion of the source code on an outcome of the mapping; and updating the GUI for visually distinguishing the at least one of: the at least one node and the at least one edge of the projection graph; and (ii) receiving, via the GUI, a user selection of at least one of: at least one node and at least one edge of the projection graph;

determining a portion of the source code corresponding to the at least one of: the at least one node and the at least one edge of the projection graph, wherein the determining is performed by executing a query of the user selected the at least one of: the at least one node and the at least one edge, on the outcome of the mapping; and updating the GUI for visually distinguishing the portion of the source code.

* * * * *